United States Patent
Buermann et al.

(10) Patent No.: US 7,110,100 B2
(45) Date of Patent: Sep. 19, 2006

(54) APPARATUS AND METHOD FOR DETERMINING AN INCLINATION OF AN ELONGATE OBJECT CONTACTING A PLANE SURFACE

(75) Inventors: Dale H. Buermann, Los Altos, CA (US); Hector H. Gonzalez-Banos, Mountain View, CA (US); Michael J. Mandella, Palo Alto, CA (US); Stewart R. Carl, Palo Alto, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 319 days.

(21) Appl. No.: 10/701,817

(22) Filed: Nov. 4, 2003

(65) Prior Publication Data

US 2005/0107979 A1 May 19, 2005

(51) Int. Cl.
*G01B 11/26* (2006.01)
*G01C 1/00* (2006.01)

(52) U.S. Cl. .................................... 356/138
(58) Field of Classification Search ............. 356/138, 356/139, 139.1; 250/206.1, 206.2; 341/5; 178/18.09, 18.11; 382/119–123
See application file for complete search history.

(56) References Cited

U.S. PATENT DOCUMENTS

| | | |
|---|---|---|
| 5,166,668 A | 11/1992 | Aoyagi |
| 5,239,489 A | 8/1993 | Russell |
| 5,434,371 A | 7/1995 | Brooks |
| 5,764,611 A | 6/1998 | Watanabe |
| 5,786,804 A | 7/1998 | Gordon |
| 5,850,058 A | 12/1998 | Tano et al. |
| 5,902,968 A | 5/1999 | Sato et al. |
| 5,959,617 A | 9/1999 | Bird et al. |
| 5,977,958 A | 11/1999 | Baron et al. |
| 5,981,884 A | 11/1999 | Sato et al. |
| 6,023,291 A | 2/2000 | Kamel et al. |

(Continued)

OTHER PUBLICATIONS

Goldstein et al., Classical Mechanics, 3rd edition, Addison Wesley 2002, Chapters 4 & 5.

(Continued)

*Primary Examiner*—Gregory J. Toatley, Jr.
*Assistant Examiner*—Isiaka O. Akanbi
(74) *Attorney, Agent, or Firm*—Lumen Intellectual Property Services, Inc.

(57) ABSTRACT

An apparatus and method for determining an inclination angle θ between an axis of an elongate object such as a cane, a pointer or a jotting implement such as a pen, pencil, stylus or the like and a normal to a plane surface at times when a tip of the elongate object is contacting that plane surface. The apparatus has an emitter mounted on the object for illuminating the plane surface with a probe radiation at an angle σ with respect to the axis of the object. The apparatus also has a detector mounted on the elongate object for detecting a radiation characteristic of a scattered portion of the probe radiation returning from the plane surface and a computing unit for deriving the inclination angle θ from the radiation characteristic. A scanning arrangement, such as a uniaxial or biaxial scanner, or a light guiding optic can be used for varying angle σ, and the probe radiation can be emitted in the form of a scan beam. Preferably, the emitter and detector of the scattered portion of the probe radiation are integrated and the scattered portion of the probe radiation whose characteristic is being measured is the back-scattered portion. The radiation characteristic detected by the detector can be the intensity, polarization, time-of-flight or any combination thereof.

21 Claims, 14 Drawing Sheets

U.S. PATENT DOCUMENTS

| | | |
|---|---|---|
| 6,033,086 A | 3/2000 | Bohn |
| 6,057,909 A | 5/2000 | Yahav et al. |
| 6,081,261 A | 6/2000 | Wolff |
| 6,181,329 B1 | 1/2001 | Stork et al. |
| 6,212,296 B1 | 4/2001 | Stork et al. |
| 6,249,274 B1 | 6/2001 | Teufel et al. |
| 6,323,942 B1 | 11/2001 | Bamji |
| 6,330,057 B1 | 12/2001 | Lederer et al. |
| 6,331,911 B1 | 12/2001 | Manassen et al. |
| 6,424,407 B1 | 7/2002 | Kinrot et al. |
| 6,449,103 B1 | 9/2002 | Charles |
| 6,492,981 B1 | 12/2002 | Stork et al. |
| 6,556,190 B1 | 4/2003 | Fleck et al. |
| 6,583,866 B1 * | 6/2003 | Jung et al. ............. 356/73 |
| 6,592,039 B1 | 7/2003 | Smith et al. |
| 6,627,870 B1 | 9/2003 | Lapstun et al. |
| 6,650,320 B1 | 11/2003 | Zimmerman |
| 6,686,579 B1 | 2/2004 | Fagin et al. |
| 2002/0001029 A1 | 1/2002 | Abe |
| 2002/0048404 A1 | 4/2002 | Fahraeus et al. |
| 2002/0141616 A1 | 10/2002 | Cox et al. |
| 2002/0148655 A1 | 10/2002 | Cho et al. |
| 2002/0180714 A1 | 12/2002 | Duret |
| 2003/0025951 A1 | 2/2003 | Pollard et al. |
| 2003/0029919 A1 | 2/2003 | Lynggaard et al. |
| 2003/0034961 A1 | 2/2003 | Kao |
| 2003/0063200 A1 | 4/2003 | Isoyama |
| 2003/0195820 A1 | 10/2003 | Silverbrook et al. |
| 2004/0231122 A1 * | 11/2004 | Sawyer et al. ........... 29/407.09 |

OTHER PUBLICATIONS

Schramm and Meyer, "Computer Graphic Simulation of Light Reflection from Paper", IS&T Pics Conference, 1998, pp. 412-423.

Ait-Aider et al. "Adaptation of Lowe's Camera Pose Recovery Algorithm to Mobile Self-Localisation", Robotica 2002.

Ait-Aider et al. "Model to Image Straight Line Matching Method for Vision-Based Indoor Mobile Robot Self-Location", IROS 2002, Lausanne, Sep. 30-Oct. 4.

Ansar et al., "Linear Pose Estimation from Points of Lines", ECCV 2002, LNCS 2353, pp. 282-296, 2002, Springer-Verlag Berlin Heidelberg 2002.

Batista et al., "Pose View Stability Analysis for Camera Look Angles Computation", Institute of Systems and Robotics—Dep. of Elec. Engineering, Univ. of Coimbra, Portugal.

Schroering et al., "A New Input Device for 3D Sketching", Washington University in St. Louis.

UDE, "Nonlinear Least Squares Optimisation of Unit Quatemion Functions for Pose Estimation from Corresponding Features", Conf. Pattern Recognition, Brisbane, pp. 425-427 Aug. 1998.

* cited by examiner

Measured Reflectance Functions for paper samples inked (light) and non-inked (bold) at: a) -45°incidence; b) -75°incidence

APPARATUS AND METHOD FOR DETERMINING AN INCLINATION OF AN ELONGATE OBJECT CONTACTING A PLANE SURFACE

FIELD OF THE INVENTION

The present invention relates generally to determining an inclination angle θ between an elongate object and a normal to a plane surface with which a tip of the elongate object is in contact.

BACKGROUND OF THE INVENTION

When an object moves with respect to stationary references such as a ground plane, fixed points, lines or reference surfaces knowledge of the object's inclination with respect to these references can be used to derive a variety of its parameters of motion. In fact, inclination of the object with respect to a reference is usually required for navigating the object or obtaining information about its trajectory. Over time, many useful coordinate systems and methods have been developed to parameterize the equations motion of such objects. For a theoretical background the reader is referred to textbooks on classical mechanics such as Goldstein et al., Classical Mechanics, 3$^{rd}$ Edition, Addison Wesley 2002. For general examples of object tracking and inclination measurements a few examples can be found in U.S. Pat. No. 5,786,804 to Gordon and U.S. Pat. No. 6,023,291 to Kamel et al. as well as the references cited therein.

In one specific field of navigation it is important to know the inclination of an elongate object while it is in contact with a plane surface. Usually, inclination is defined to an axis of the object that passes through the point of contact with the plane surface. In some cases, this axis is also the center axis of the elongate object. Various types of elongate objects can benefit from knowledge of their inclination while in contact with a plane surface. These objects include canes such as walking canes when in touch with the ground, pointers when in touch with a display or projection surface, writing devices when in touch with a writing surface, styluses when in touch with a screen.

The need to determine inclination is deeply felt in the field of input devices such as pens and styluses. Here, inclination has to be known in order to analyze the information written or traced by the user. In principle, many methods can be adapted to measure pen inclination. Such methods can employ ranging devices using ultrasound, electromagnetic radiation including visible light and other apparatus. For example, U.S. Pat. No. 5,166,668 teaches a 3-axis detection method, U.S. Pat. No. 5,977,958 teaches a method using a difference in the time-of-flight of an electromagnetic wave and still other references teach to apply the time-of-flight method to microwaves. Still other approaches use calibration marks, e.g., as described in U.S. Pat. Appl. 2003/0025951 or entire auxiliary calibration systems as described in U.S. Pat. Appl. 2002/0141616. Still another method for measuring the inclination of a pen with respect to the vertical employs sensors mounted in the pen for measuring magnetic fields created by magnetic dipoles and oriented perpendicular to a writing board as described in U.S. Pat. Appl. 2002/0180714. Unfortunately, all of these methods are cumbersome and limiting to the user because the signals sent from the pen have to be received by external devices. In other words, the pen cannot determine its inclination independently with on-board equipment.

Clearly, it is desirable to have pen and stylus input devices that can determine their inclination independently with their own on-board equipment. In principle, pens using inertial sensors such as gyroscopes and accelerometers can be designed to derive their inclination without external devices. Japan patent application 6-67,799 proposes a method using a 2-axis acceleration sensor and the inclination angle is determined by integrating the angular velocity of the pen. Also of interest are U.S. Pat. Nos. 5,902,968; 5,981,884 using a 3-axis acceleration sensor and a 3-axis gyroscope. U.S. Pat. No. 5,434,371 teaches a structure in which an acceleration sensor is attached to the tip of a pen such to thus compensate the error due to pen inclination and a signal processing portion is located at the upper portion of the pen. Unfortunately, inertial sensors suffer from drift errors and accumulation errors that typically increase as time squared for accelerometers and linearly with time for gyroscopes.

An approach attempting to overcome the limitations of inertial sensors U.S. Pat. Appl. No. 2002/0148655 to Cho et al. teaches the use of an optical 3-dimensional detection device for detecting orientation angles of a center axis of an electronic pen relative to a ground and a height of the pen over a writing surface. Meanwhile, a 3-axis accelerometer is used for detecting movement of the pen. The optical device has a portion such as a light source for radiating a beam to the writing surface to form beam spots and a detecting portion such as a camera and corresponding optics for detecting the beam spots from the light reflected off the writing surface. This solution requires a dedicated camera and light source to detect the orientation angles and it should be noted that a significant separation between the viewpoints of the camera and the light source has to be significant in order to obtain accurate values of the orientation angles.

Still another optical method of detecting inclination in manual pen type reading devices is found in U.S. Pat. No. 5,764,611 to Watanabe. According to this method a CCD arranged in the pen type reading device picks up a dot code from the sheet and an inclination sensor arranged at the rear end of the device detects an inclined state of the device with respect to the sheet. The inclination sensor can use various mechanisms and methods for determining the inclination angle including analysis of a luminance distribution, image blurring, distance between markers on the sheet, positional shift or change in size of the markers. This solution relies on prior knowledge surface or on pre-existing data present on the surface, e.g., markers. Therefore, this method is not adaptable to a self-contained pen or stylus or other elongate object whose tip is in contact with any plane surface.

OBJECTS AND ADVANTAGES

In view of the shortcomings of the prior art, it is the object of the invention to provide an apparatus and method for determining the inclination of elongate objects, including objects such as canes, pointers, pens or styluses when in contact with a plane surface. More specifically, it is an object of the invention to provide an apparatus and method to obtain the inclination angle θ between a normal to the plane surface and an axis of the elongate object, e.g., the center axis of a pen, not requiring a camera and light source illumination from a separate viewpoint, not reliant on pre-printed features and applicable to various plane surfaces.

It is another object of the invention to ensure that the apparatus is small and compatible with a self-contained pen or stylus.

These and numerous other advantages will become apparent upon reading the detailed description in conjunction with the drawing figures.

SUMMARY OF THE INVENTION

The present invention provides an apparatus for determining an inclination angle θ between an axis of an elongate object and a normal to a plane surface at times when a tip of the elongate object is contacting that plane surface. The elongate object can be any generally pointed object such as a cane, a pointer, a jotting implement such as a pencil, pen, or stylus or indeed any other elongate object that would benefit from knowledge of inclination angle θ while its tip is in contact with the plane surface. The apparatus has an emitter mounted on the object for illuminating the plane surface with a probe radiation at an angle σ with respect to the axis of the object. When the object is a pen the tip is a writing nib and the axis can be the center axis of the pen passing through the tip.

The elongate object has a detector for detecting a radiation characteristic of a scattered portion of the probe radiation returning from the plane surface. Furthermore, it also has a computing unit for deriving the inclination angle θ from the radiation characteristic.

In the preferred embodiment the apparatus has a scanning arrangement for varying angle σ. In one embodiment the scanning arrangement has a uniaxial scanner that varies angle σ by only changing one of its components, i.e., an x-component $\sigma_x$. This is done by introducing an x-deflection $\gamma_x$. The uniaxial scanner has a scan arm and a uniaxial scan mirror mounted at the end of the scan arm. It also has an X-driver for controlling the x-deflection $\gamma_x$ that varies the x-component $\sigma_x$ of angle σ.

Alternatively, the scanning arrangement has a biaxial scanner for varying scan angle σ along two scanning axes. In particular, the biaxial scanner varies an x-component ax and a y-component $\sigma_y$ of angle σ by introducing an x-deflection $\gamma_x$ and a y-deflection $\gamma_y$. In one embodiment, the biaxial scanner has a scan arm with a biaxial scan mirror. In an alternative embodiment, the biaxial scanner has two uniaxial mirrors.

In still another alternative embodiment, the apparatus has a light guiding optic. Such optic can be any element, including holographic, refractive and diffractive for varying or determining angle σ.

In some embodiments the emitter of probe radiation and the detector of scattered portion of the probe radiation are integrated. In other embodiments, the emitter and detector are offset from each other by a certain distance. In either case, the scattered portion of the probe radiation can be the back-scattered portion. In order to collect the back-scattered portion of the probe radiation the detector has to intercept the back-scattered portion at the back-scatter angle which is equal to the angle of incidence of the probe radiation at the plane surface. Appropriate optical path arrangement and optics, e.g., beam splitters, are used to ensure this.

The apparatus can use various types of detectors to measure different radiation characteristics. In one embodiment, the detector has a time-of-flight measuring unit and the radiation characteristic is a flight time. The flight time corresponds to the time between emission of probe radiation by the emitter and return of back-scattered portion to the detector. In another embodiment, the detector has an intensity measurement unit and the radiation characteristic is a back-scattered intensity. Still other types of detectors, including ones detecting a polarization of the back-scattered portion can be used. In embodiments where the radiation characteristic is polarization the emitter is set to emit the probe radiation in a known polarization state.

In the preferred embodiment the apparatus has an optic for shaping the probe radiation into a scan beam. Preferably, the apparatus has a number of scan arms and an optic for shaping the probe radiation into a corresponding number of scan beams.

The computing unit that derives inclination angle θ from the radiation characteristic is preferably also located on the object. In an alternative embodiment, the computing is located away from the object and the data representing the radiation characteristic is delivered from the collector to the computing unit via a communication link or channel.

In the preferred embodiment the emitter is a single frequency emitter. For example, the emitter is a laser, e.g., a laser diode or a vertical cavity surface emitting laser (VCSEL).

The method of invention is used for determining the inclination angle θ of the object to the plane surface. The steps of the method involve emitting the probe radiation from height h on the object and at scan angle σ to the axis and detecting a radiation characteristic of the scattered portion and preferably the back-scattered portion of the probe radiation. Then, the inclination angle θ is derived from the radiation characteristic. The probe radiation is preferably shaped into at least one scan beam and angle σ is varied in a known pattern, e.g., a scan line.

The details of the invention will now be described in detail with reference to the drawing figures.

DETAILED DESCRIPTION

Figure 1A:
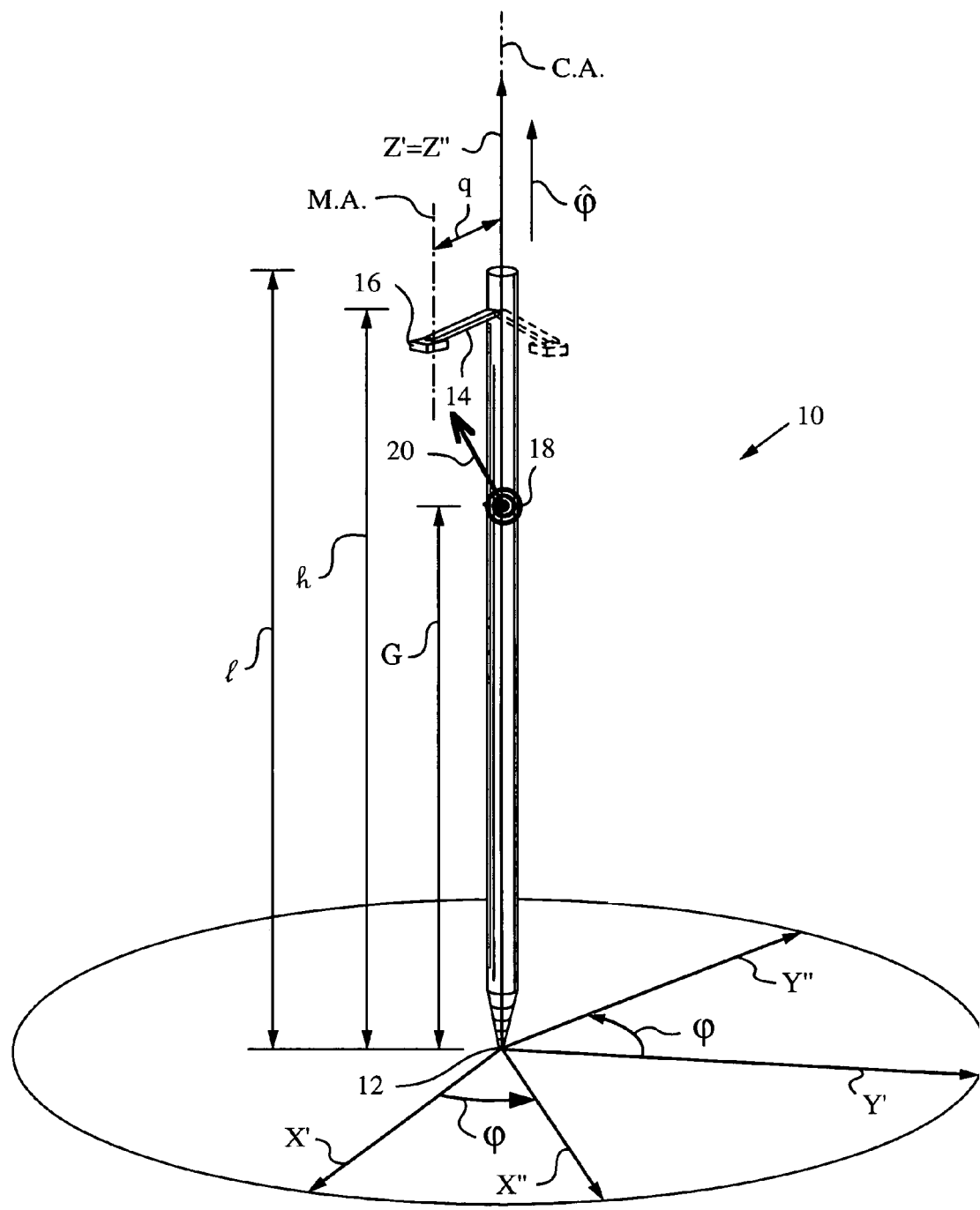
FIGS. 1A–C are diagrams illustrating Euler rotations of an elongate object with a single scan arm.

The present invention will be best understood by initially reviewing Euler rotations as used herein to describe the pose of an elongate object 10. FIG. 1A illustrates object 10 of length l with a tip 12 at the origin of non-rotated object coordinates (X',Y',Z'). An axis of object 10, in the present embodiment a center axis or center axis denoted by C.A. is collinear with the Z' axis. Axis C.A. passes through tip 12 and the origin of non-rotated object coordinates (X',Y',Z'). A scan arm 14 of length q is mounted on object 10 at a height h perpendicular to axis C.A. Scan arm 14 carries a scan mirror 16 having a mirror axis M.A. that is parallel to axis C.A. when scan mirror 16 is in the resting or neutral position. A source or emitter 18 is mounted at height G for delivering a probe radiation 20 to scan mirror 16.

A person skilled in the art will appreciate that many conventions exist for rotating object 10. In the convention adopted herein scan arm 14 is initially aligned parallel with axis X' of non-rotated object coordinates. In all of these illustrations object 10 is rotated from initial upright position together with object coordinates to visualize the rotation convention.

FIG. 1A illustrates a first counterclockwise rotation by first Euler angle φ of object coordinates (X',Y',Z') about the Z' axis. This rotation of the object coordinates does not affect the Z' axis so once rotated Z" axis is collinear with non-rotated Z' axis (Z"=Z'). On the other hand, axes X' and Y' are rotated by first Euler angle φ to yield once rotated axes X" and Y".

Figure 1B:
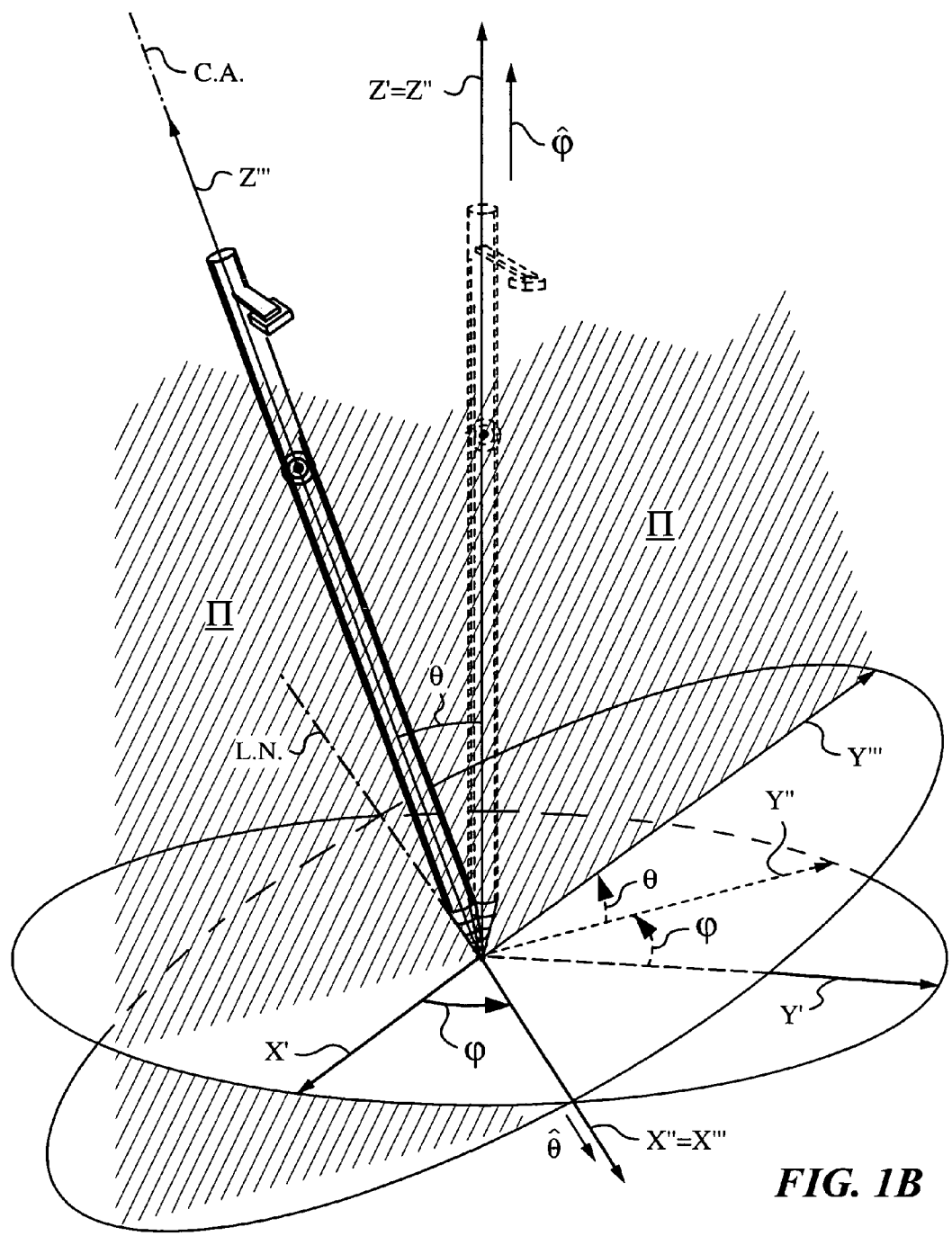

FIG. 1B illustrates a second counterclockwise rotation by second Euler angle θ applied to once rotated object coordinates (X",Y",Z"). This second rotation is performed about the once rotated X" axis and therefore it does not affect the X" axis (X'"=X"). On the other hand, axes Y" and Z" are rotated by second Euler angle θ to yield twice rotated axes Y'" and Z'". This second rotation is performed in a plane Π containing once rotated axes Y", Z" and twice rotated axes Y'", Z'". Note that axis C.A. of object 10 is rotated counterclockwise by second Euler angle θ in plane Π and remains collinear with twice rotated axis Z'".

Figure 1C:
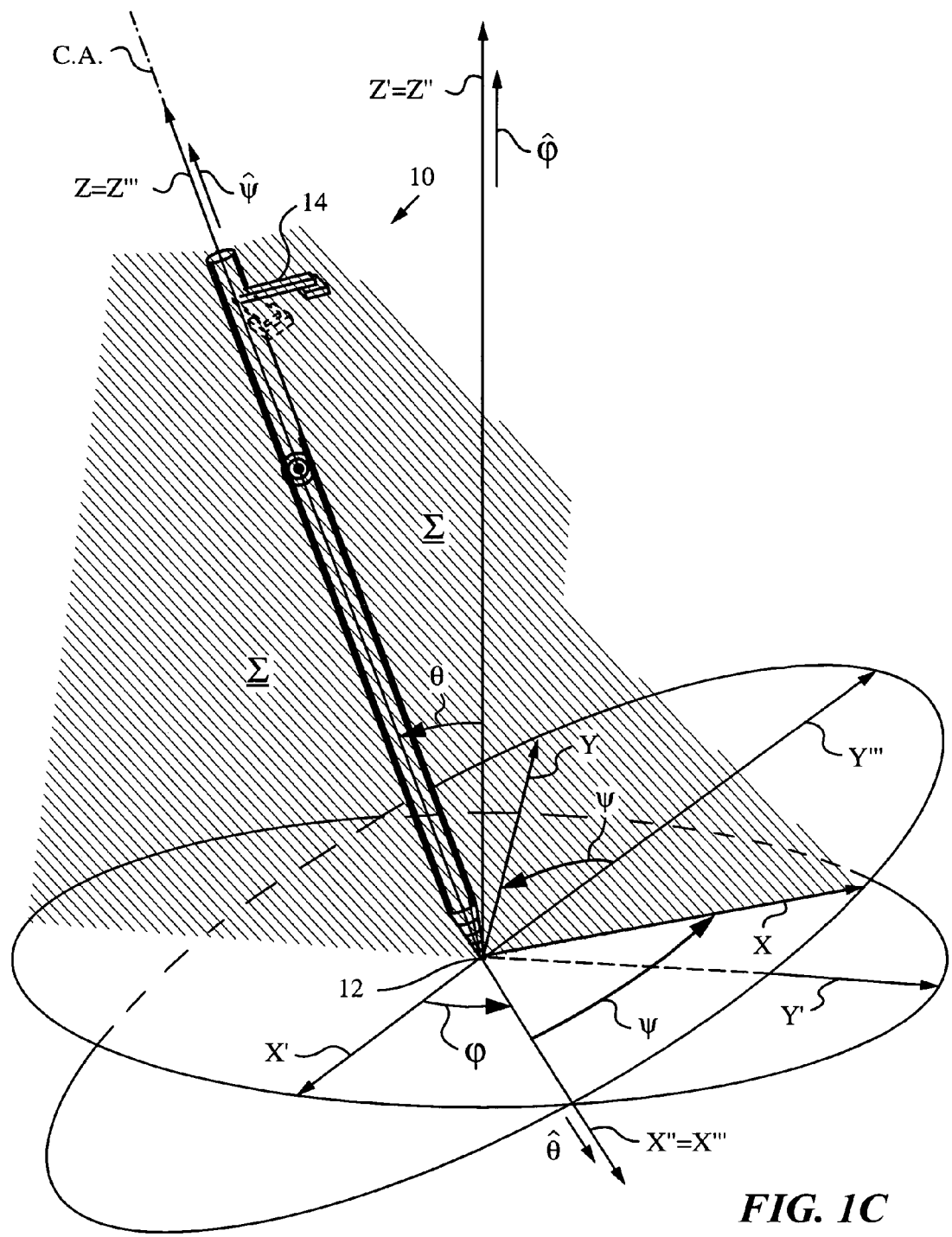

A third counterclockwise rotation by third Euler angle ψ is applied to twice rotated object coordinates (X'",Y'",Z'") as shown in FIG. 1C. Rotation by ψ is performed about twice rotated axis Z'" that is already collinear with object axis Z rotated by all three Euler angles. Meanwhile, twice rotated axes X'",Y'" are rotated by ψ to yield object axes X,Y rotated by all three Euler angles. Object axes X,Y,Z rotated by all three Euler angles ψ, θ and ψ define Euler rotated object coordinates (X,Y,Z). Note that tip 12 of object 10 remains at the origin of all object coordinates during the Euler rotations. Also note that a plane Σ containing axis C.A. of object 10 and arm 14 is now at angle (π/2)-ψ to plane Π containing axis Z' and axis C.A.

Figure 2:
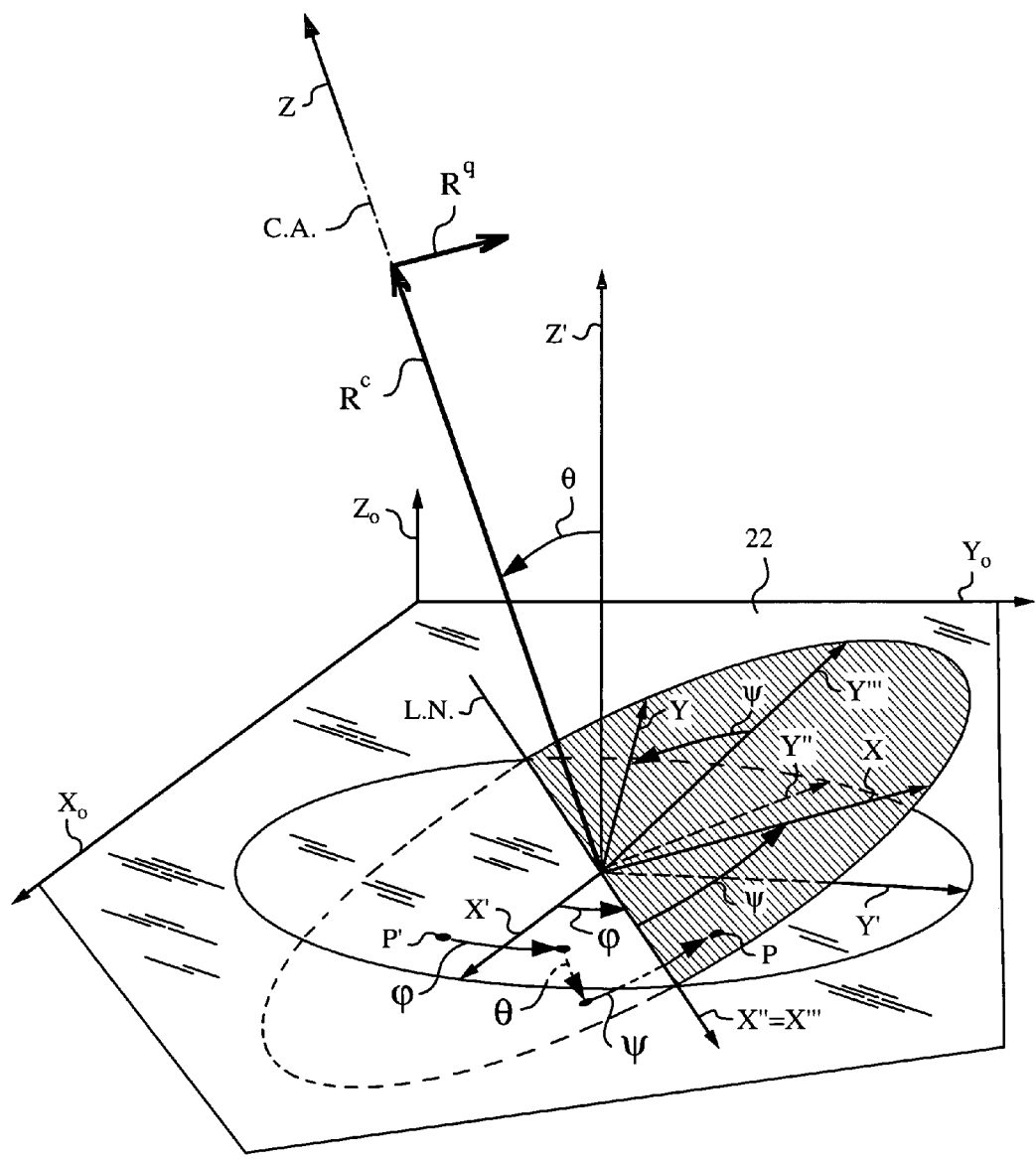
FIG. 2 is a diagram illustrating the coordinate transformation of a point in a world coordinate system undergoing Euler rotations.

In FIG. 2 object 10 is represented in a simplified form by a vector $R^c$ extending from tip 12 of object 10 to height h along axis C.A. and a vector $R^q$ extending from the tip of vector $R^c$ along arm 14 to the center of scan mirror 16. Object 10 has its tip 12 coincident with the tail of vector $R^c$ on a plane surface 22 defined by an ($X_o$,$Y_o$) plane in world coordinates ($X_o$,$Y_o$,$Z_o$) In the world coordinates object axis Z' prior to the three Euler rotations is normal to plane ($X_o$,$Y_o$). Now, second Euler angle θ defines the only counterclockwise rotation of object coordinates that is not about an object Z axis (this second rotation is about the X"=X'" axis rather than axis Z', Z" or Z'"). Thus, Euler angle θ is an inclination angle θ between the completely Euler rotated object axis Z or axis C.A. and original object axis Z', which is normal to plane ($X_o$,$Y_o$) at the point of contact of tip 12. This can also be seen by following the effects of the three Euler rotations on a point P' originally located in world plane ($X_o$,$Y_o$) coplanar with object plane (X',Y') prior to Euler rotations. Only second rotation by angle θ moves point P' out of plane ($X_o$,$Y_o$) and into final Euler rotated object plane (X,Y).

Figure 3:
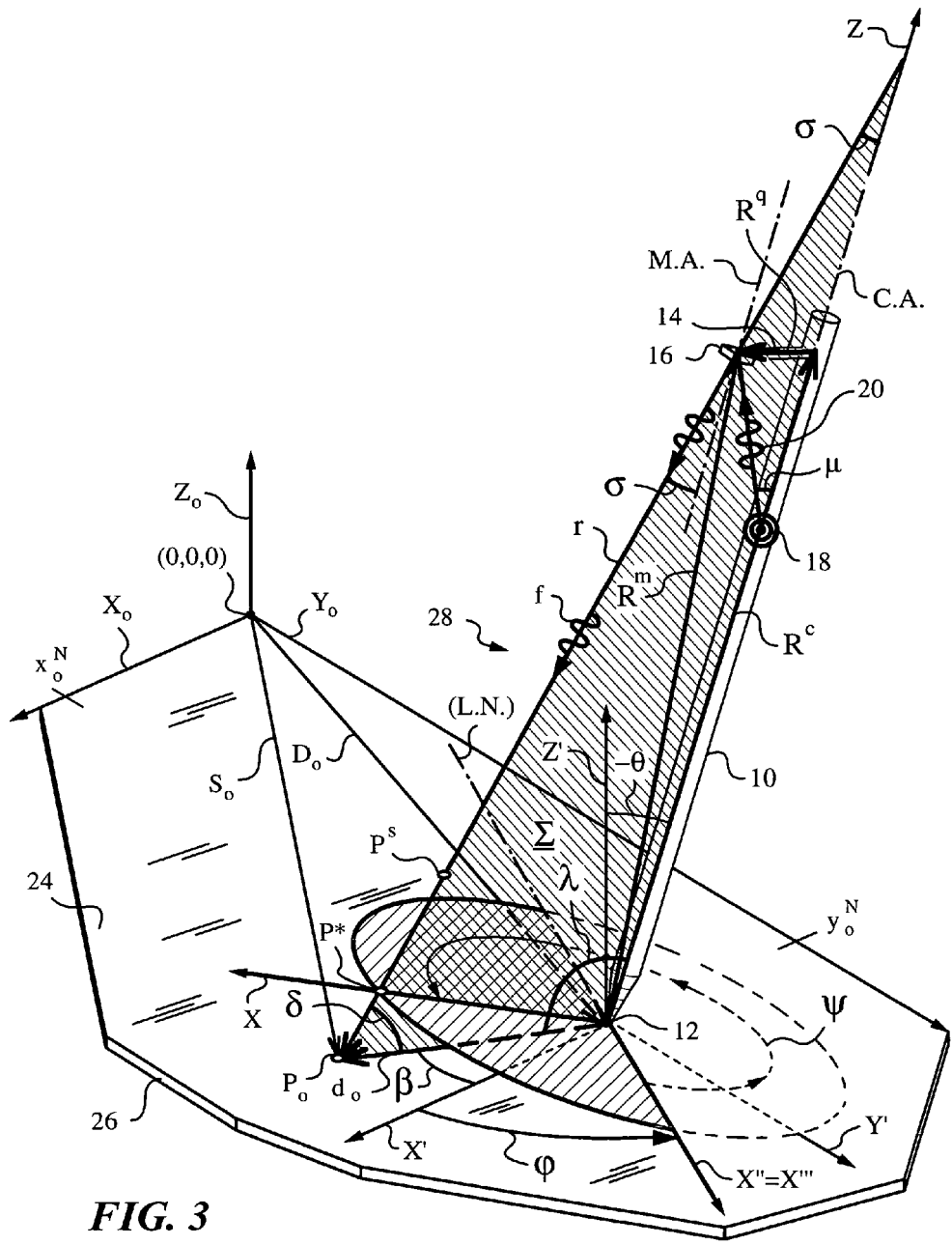
FIG. 3 is a diagram illustrating the localization of a scan point made by a scan beam emitted at a scan angle σ from the scan arm of the elongate object after it has been rotated by Euler angles (φ,θ,ψ)

FIG. 3 is a three-dimensional diagram illustrating elongate object 10 in Euler rotated coordinates (X,Y,Z). In this case the Euler angles are different from those in FIGS. 1A–C, 2; they are selected to produce a pose that better visualizes the scanning of probe radiation 20 by mirror 16. In addition, world plane ($X_o$,$Y_o$) corresponds to a plane surface 24 of a substrate 26. For example, if object 10 is a pointer substrate 26 can be a screen, if object 10 is a jotting implement, e.g., a pen or pencil then substrate 26 can be a sheet of paper, and if it is a stylus then substrate 26 can be a screen of a digital input device. The origin $X_o$,$Y_o$,$Z_o$ of world coordinates ($X_o$,$Y_o$,$Z_o$) is in the upper right corner of surface 24.

Emitter 18 is preferably a coherent source, e.g., a laser diode or a Vertical Cavity Surface Emitting Laser (VCSEL), however, non-coherent sources including light emitting diodes (LEDs) can also be used. In the present embodiment emitter 18 is a VCSEL emitting probe radiation 20 at a frequency f and at an emission angle μ to center axis C.A. of object 10. Optics (see FIG. 4) are provided in the path of probe radiation 20 to form a scan beam 28. Scan mirror 16 mounted on scan arm 14 of length q (represented here by vector $R^q$) reflects scan beam 20 at an angle σ with respect to axis C.A. of object 10. In the present embodiment mirror 16 is in an undeflected or neutral position and its mirror axis M.A. is parallel to axis C.A. Hence, emission angle μ is equal to angle σ.

Scan beam 28 propagates along a path indicated by vector r and impinges on surface 24 of substrate 26 to form a scan point $P_o$ at ($x_o^s$,$y_o^s$,0) in world plane ($X_o$,$Y_o$) of world coordinates ($X_o$,$Y_o$,$Z_o$). The origin of Euler rotated coordinates (X,Y,Z) at tip 12 of object 10 is on surface 24, i.e., also in world plane ($X_o$,$Y_o$). Note that this world plane is co-planar with plane (X',Y') of non-rotated object coordinates (X',Y',Z'). The origin of object coordinates (non-rotated and rotated) is offset from the origin of world coordinates ($X_o$,$Y_o$,$Z_o$) by displacement vector $D_o$ where the length of $D_o$, i.e., |$D_o$| is:

$$|D_o| = \sqrt{(x_o^N)^2 + (y_o^N)^2}. \quad \text{(Eq. 1)}$$

Also, scan point $P_o$ in world coordinates ($X_o$,$Y_o$,$Z_o$) is offset from the origin of object coordinates by vector $d_o$ that is at an angle β to axis X' in non-rotated plane (X',Y') or in world plane ($X_o$,$Y_o$).

Figure 4:
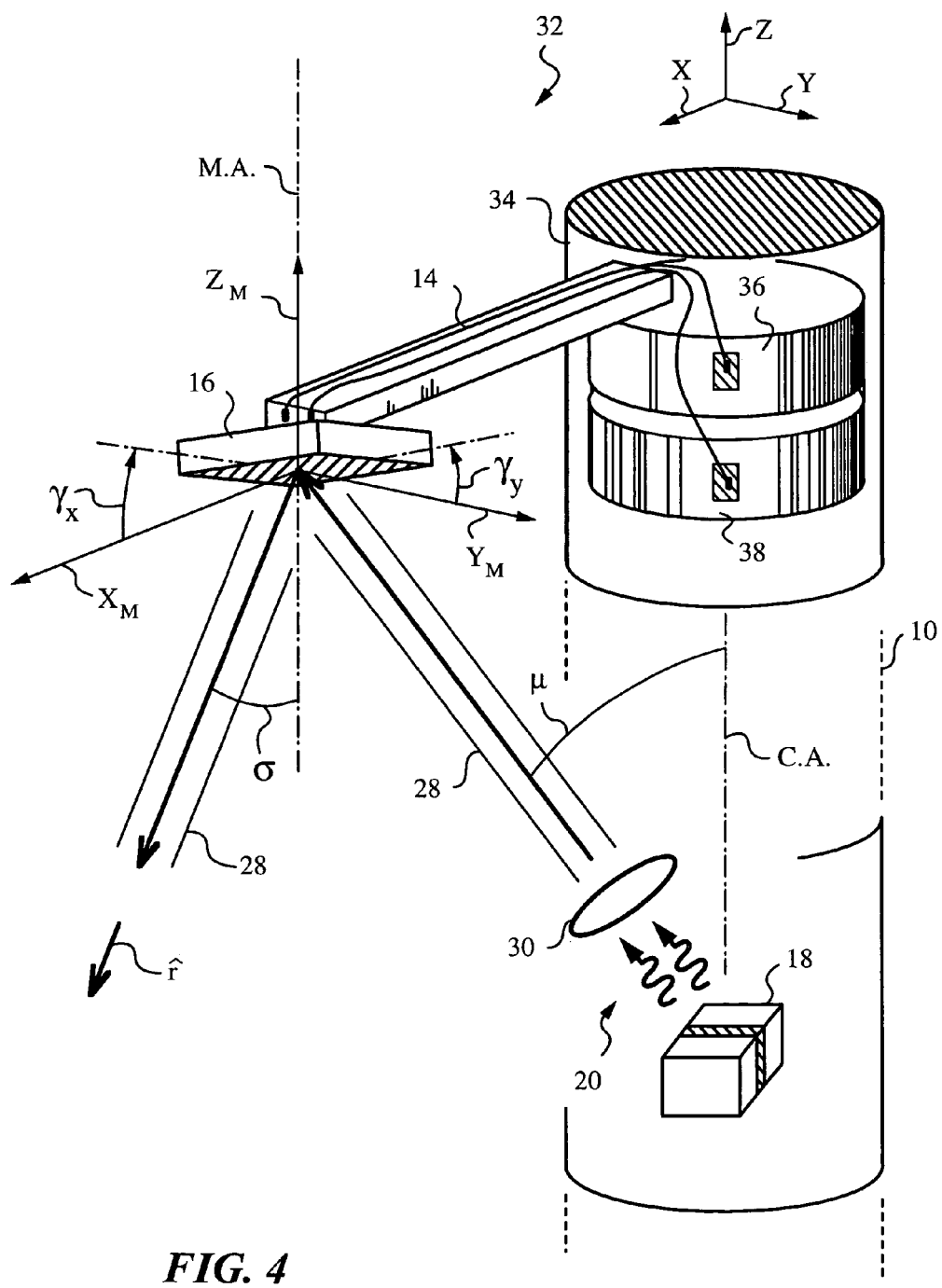
FIG. 4 is a partial view of the elongate object illustrating in detail a scanning arrangement with a biaxial scanner.

In the present embodiment scan arm 14, scan mirror 16, emitter 18 and optics 30 are part of a scanning arrangement 32, better illustrated in FIG. 4. Scanning arrangement 32 scans probe radiation 20 collimated in a scan beam 28 by optics 30 over surface 24 by varying angle σ. To accomplish this, scanning arrangement 32 has a biaxial scanner 34 consisting of an X-driver 36 and a Y-driver 38 for varying angle σ along two scanning axes denoted here by $X_M$ and $Y_M$. Scan mirror 16 is a biaxial scan mirror and is preferably a MEMs mirror. Alternatively, two uniaxial mirrors can be used instead of single biaxial scan mirror 16. Both, uniaxial and biaxial mirrors are known in the art. Although scanning axes $X_M$ and $Y_M$ are orthogonal in this embodiment, a skilled artisan will appreciate that this is not required.

X-driver 36 varies an x-component $\sigma_x$ of angle $\sigma$ by controlling an x-deflection $\gamma_x$ of mirror 16 to axis $X_M$. For small deflections, the variation in angle $\sigma$ can be expressed in terms of x- and y-components of angle $\sigma$, i.e., $\sigma_x$ and $\sigma_y$. Y-driver 38 varies a y-component $\sigma_y$ of angle $\sigma$ by controlling a y-deflection $\gamma_y$ of mirror 16 to axis $Y_M$. Note that x-component $\sigma_x$ is contained in plane $\Sigma$. X- and y-components of angle $\sigma$ can thus be expressed as:

$$\sigma = (\sigma_x, \sigma_y) = (\mu + 2\gamma_x, 2\gamma_y). \quad \text{(Eq. 2)}$$

It should be noted that x- and y-components of angle $\sigma$ are thus defined with respect to the mirror axis M.A. in the neutral or undeflected position or equivalently with respect to axis C.A. of object 10 in Euler rotated object coordinates.

Referring back to FIG. 3, note that scan beam 28 or vector r intersects plane (X,Y) at point P* and continues to impinge on surface 24 at scan point $P_o$. To obtain the position of scan point $P_o$ in world coordinates on surface 24 several steps are required. First, we need a coordinate transformation from plane (X',Y') in non-rotated object coordinates to plane (X,Y) in Euler rotated object coordinates. This transformation is defined in Euler angles by matrix R:

$$R = \begin{vmatrix} \cos\psi\cos\varphi - \cos\theta\sin\varphi\sin\psi & \cos\psi\sin\varphi + \cos\theta\cos\varphi\sin\psi & \sin\theta\sin\psi \\ -\sin\psi\cos\varphi - \cos\theta\sin\varphi\cos\psi & -\sin\psi\sin\varphi + \cos\theta\cos\varphi\cos\psi & \sin\theta\cos\psi \\ \sin\theta\sin\varphi & -\sin\theta\cos\varphi & \cos\theta \end{vmatrix}.$$

The coordinates of a point (x',y',z') in non-rotated object coordinates (X',Y',Z') are transformed to point (x,y,z) in Euler rotated object coordinates (X,Y,Z) by applying matrix R as follows:

$$(x,y,z) = R(x',y',z'). \quad \text{(Eq. 3A)}$$

A reverse coordinate transformation from Euler rotated to non-rotated object coordinates is performed as follows:

$$(x', y', z') = R^T(x,y,z), \quad \text{(Eq. 3B)}$$

where superscript T denotes the transpose of matrix R.

The position of point P* (x,y) in plane (X,Y) of Euler rotated object coordinates is determined by biaxial scanner 34 as a function of deflections $\gamma_x$, $\gamma_y$ as follows:

$$P^*(x,y) = (q + h \sin \sigma_x, h \sin \sigma_y) = (q + h \sin(\mu + 2\gamma_x), h \sin(2\gamma_y)) \quad \text{(Eq. 4)}$$

We observe that all points $P^s$ along scan beam 28 or along vector r including point P* and scan point $P_o$ can be described in the Euler rotated object coordinates by the following parametric equation:

$$P^s(x,y,z) = (q,0,h) + s[(x,y,0) - (q,0,h)] = (q + s(x-q), sy, h - sh) \quad \text{(Eq. 5)}$$

where s is a parameter. At scan point $P_o$ where scan beam 28 intersects world plane $(X_o, Y_o)$, namely at $(x_o^s, y_o^s, 0)$, the value of parameter s is:

$$s = \frac{(q\sin\theta\sin\psi + h\cos\theta)}{(h\cos\theta - (x-q)\sin\theta\sin\psi - y\sin\theta\cos\psi)}. \quad \text{(Eq. 6)}$$

Substituting this value of s into equation 5 yields scan point $P_o$ in Euler rotated object coordinates. Now, using transpose matrix $R^T$ from equation 3B one obtains scan point $P_o$ in world coordinates $(X_o, Y_o, Z_o)$:

$$P_o(x_o^s, y_o^s, 0) = R^T(P^s(x,y,z)) + D_o. \quad \text{(Eq. 7)}$$

Note that the value of $z_o^s$ of point $P_o$ in world coordinates has to be zero because scan point $P_o$ is in world plane $(X_o, Y_o)$. The length of vector r represents the propagation distance of scan beam 28 from mirror 16 to scan point $P_o$ and is determined as follows:

$$r = |\vec{r}| = |(x - q, y, z - h)|. \quad \text{(Eq. 8)}$$

Figure 5:
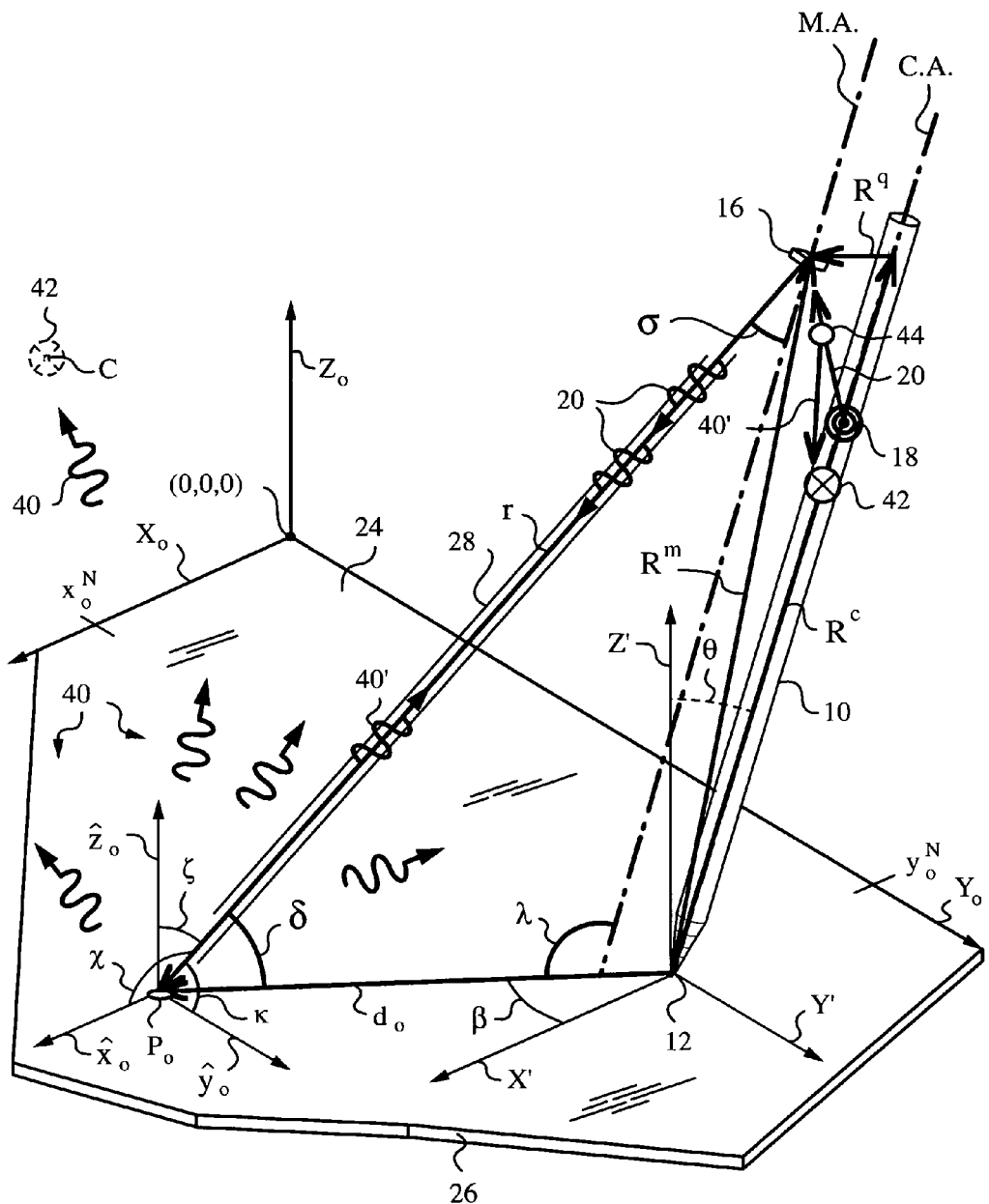
FIG. 5 is a diagram showing the angle of incidence δ of the scan beam to the plane surface on which the tip of the elongate object rests.

Knowledge of the length of vector r is used to determine an angle of incidence $\delta$ of scan beam 28 to surface 24, as shown in FIG. 5. Angle $\delta$ is the angle between vector $d_o$ from the origin of the object coordinates to scan point $P_o$ and vector r from mirror 16 to scan point $P_o$. Therefore, angle $\delta$ can be expressed as:

$$\delta = \cos^{-1}\left\{\frac{(x, y, z) \cdot \vec{r}}{|(x, y, z)||\vec{r}|}\right\} = \cos^{-1}\left\{\frac{[x^2 + y^2 + z^2 - (xq + zh)]}{\sqrt{x^2 + y^2 + z^2}\sqrt{(x-q)^2 + y^2 + (z-h)^2}}\right\}, \quad \text{(Eq. 9)}$$

where (x,y,z) are the coordinates of scan point $P_o$ in Euler rotated object coordinates. The angle $\beta$ of vector $d_o$ to non-rotated object axis X' is obtained from the dot product rule with axis X' or world axis $X_o$.

Probe radiation 20 illuminating surface 24 of substrate 26 scatters based on incident directions of probe radiation 20 to surface 24, frequency f of probe radiation 20 as well as physical characteristics of surface 24 and substrate 26. A bidirectional reflectance distribution function (BRDF) describes the spectral and spatial characteristics of a scattered portion 40 of probe radiation 20. The BRDF is a ratio of reflected radiance to incident flux density for all incident and reflected directions. The incident directions are fully described by direction cosines $\chi$, $\kappa$ and $\zeta$, which can be obtained from the dot product of vector r with world unit vectors $\hat{x}_o, \hat{y}_o, \hat{z}_o$. Similarly, direction cosines (not shown) to unit vectors $\hat{x}_o, \hat{y}_o, \hat{z}_o$ describe the reflected directions of scattered portion 40.

Often surface 24 is Lambertian or almost Lambertian and the BRDF shows a continuous decrease from a maximum at $\zeta = 0$ (normal incidence). Preferably, whether surface 24 is or is not Lambertian, its BRDF should be measured for calibration purposes. In the simplest cases third Euler angle $\psi$ is close or equal to $\pi/2$ or $3\pi/2$. In these cases BRDF is described directly in terms of angle of incidence $\delta$ with respect to surface 24 or angle $\delta' = (\pi/2) - \delta$ with respect to surface normal $\hat{z}_o$ without having to compute direction cosines. For other values of Euler angle $\psi$ the direction cosines have to be used for a full description of the incident directions.

Scattered portion 40 of radiation 20 is used to obtain the inclination of elongate object 10 to plane surface 24, and more precisely for deriving an inclination angle θ between an axis, in this case axis C.A. and a normal to surface 24, i.e., axis Z' or surface normal $\hat{z}_o$. It should be noted that inclination angle θ and second Euler angle θ are equivalent. Portion 40 scatters from surface 24 into the half solid angle above surface 24 and can be intercepted at any point, e.g., by a detector 42 at detection point C. When the relative position of point C to object 10 is known then knowledge of the BRDF at point C is used to derive inclination angle θ.

A fixed relative position of detection point C to scan point $P_o$ is obtained by mounting detector 42 on object 10. Most preferably, detector 42 is mounted such that it collects back-scattered portion 40' of probe radiation 20 returning along the path of scan beam 28. A beam splitter 44 or other well-known optical device is employed in the path of scan beam 28 to divert back-scattered portion 40' from the path of scan beam 28 to detector 42. In these cases detector 42 is offset from emitter 18, as shown in FIG. 5. Alternatively, detector 42 is integrated with emitter 18 obviating the need for beam splitter 44.

Figure 7:
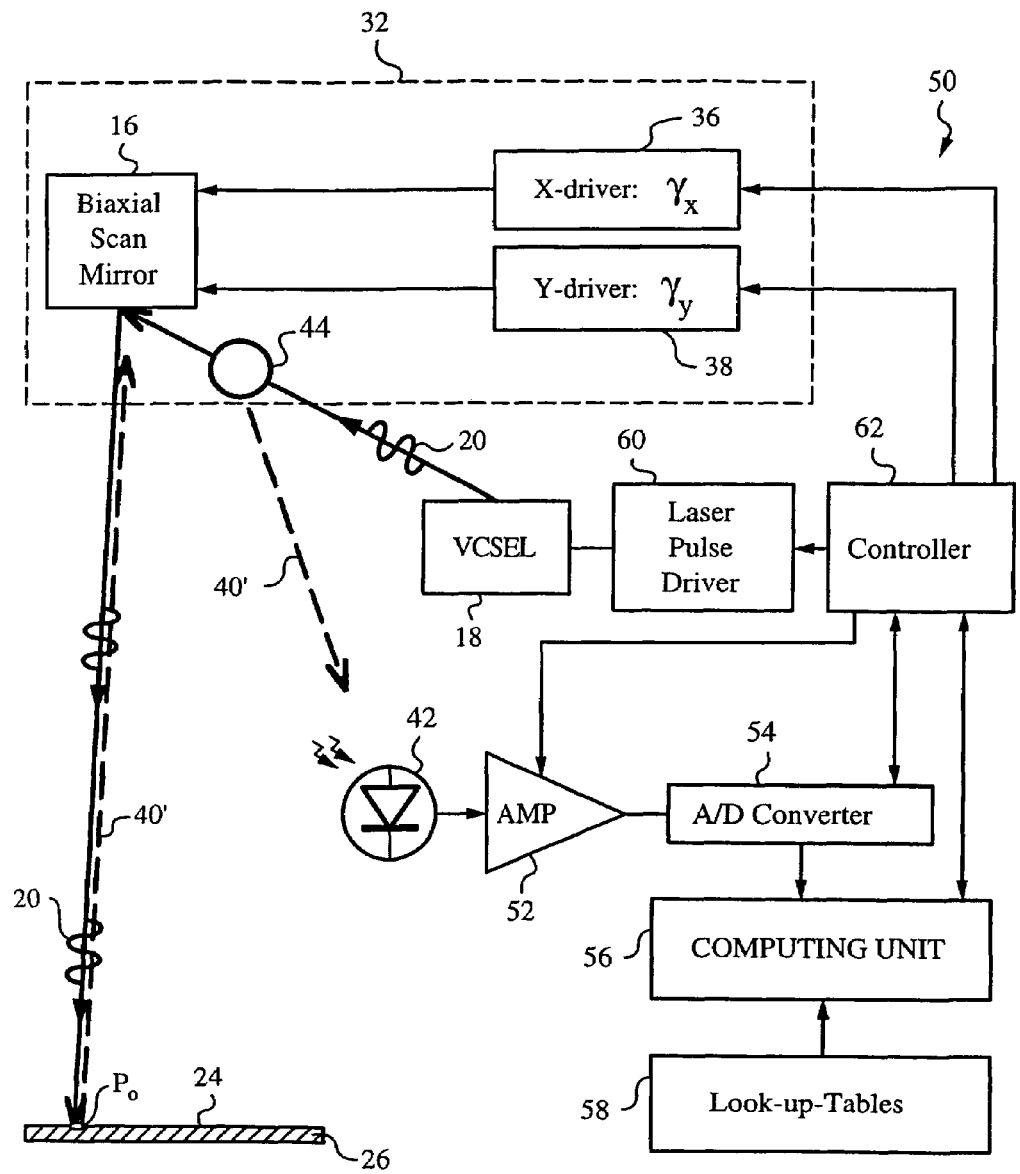
FIG. 7 is a functional schematic illustrating, the processing of information in deriving inclination angle θ from an intensity of a back-scattered portion of the probe radiation.

FIG. 7 shows an exemplary control circuit 50 for operating the apparatus of invention. A person skilled in the art will appreciate that various control circuits can be used and that their design depends, among other, on the type of detector 42 and scanning arrangement 32.

Circuit 50 is connected to scanning arrangement 32 and to detector 42. Circuit 50 has an amplifier 52 connected to detector 42 and an analog-to-digital converter ADC 54 connected to amplifier 52. Amplifier 52 amplifies signals from detector 42 and it can be a transimpedance amplifier, an operation amplifier or any other suitable amplifier. ADC 54 is matched for digitizing the amplified signal from amplifier 52. Circuit 50 also has a computing unit 56 connected to ADC 54 for receiving digital signals corresponding to signals generated by detector 42. Computing unit 56 communicates with a module 58 containing look-up tables and data required by computing unit 56 for deriving inclination angle θ. Preferably, module 58 is a rapid access memory. A laser pulse driver 60 of circuit 50 is connected to VCSEL 18 for controlling the generation of probe radiation 20.

A controller 62 orchestrates the operation of circuit 50 and synchronizes it with scanning arrangement 32 and detector 42. For this purpose, controller 62 is connected to X- and Y-drivers 36, 38, laser pulse driver 60, amplifier 52, ADC 54 and computing unit 56.

During operation, elongate object 10 executes motions some of which change inclination angle θ. In the preferred embodiment inclination angle θ is derived over time periods that are very short in comparison to the times during which object 10 moves by any appreciable amount. Controller 62 ensures that the operation of the apparatus is sufficiently rapid by adjusting the rate of operation of VCSEL 18 and scanning arrangement 32. Specifically, controller 62 instructs laser pulse driver 60 to drive VCSEL 18 at a certain pulse rate. Also, controller 62 operates X and Y-drivers 36, 38 of scanning arrangement 32 such that angle σ varies sufficiently rapidly. Now, x- and y-components $\sigma_x$, $\sigma_y$ of angle σ vary because X- and Y-drivers 36, 38 are instructed by controller 62 to change x- and y-deflections $\gamma_x$, $\gamma_y$. Consequently, scan beam 28 of probe radiation 20 passes over surface 24 and produces back-scattered portion 40' of probe radiation 20 returning from locations scanned by scan point $P_o$ on surface 24 (see FIG. 5). When object 10 is a human-operated implement such as a cane, a pointer or a jotting implement such as a pen, pencil or stylus then angle σ preferably varies faster than human movement.

The successive locations of scan point $P_o$ form a discontinuous or continuous scan depending on the pulsing of VCSEL 18. For clarity of explanation, consider a continuous scan obtained when controller 62 instructs X-driver to vary x-component $\sigma_x$ of angle σ by introducing a periodic change of x-deflection $\gamma_x$ with time t such that:

$$\gamma_x = A \sin \omega_x t, \qquad (Eq. 10)$$

In this equation $\omega_x$ is the angular frequency and A is a deflection amplitude in degrees. Meanwhile, y-component $\sigma_y$ is kept constant at 0 degrees such that $\sigma=(\sigma_x,0)$. The instantaneous value of σ can be rewritten using Equation 2 as follows:

$$\sigma(t)=(\sigma_x,\sigma_y)=(\mu+2A \sin \omega_x t, 0). \qquad (Eq. 11)$$

Figure 6:
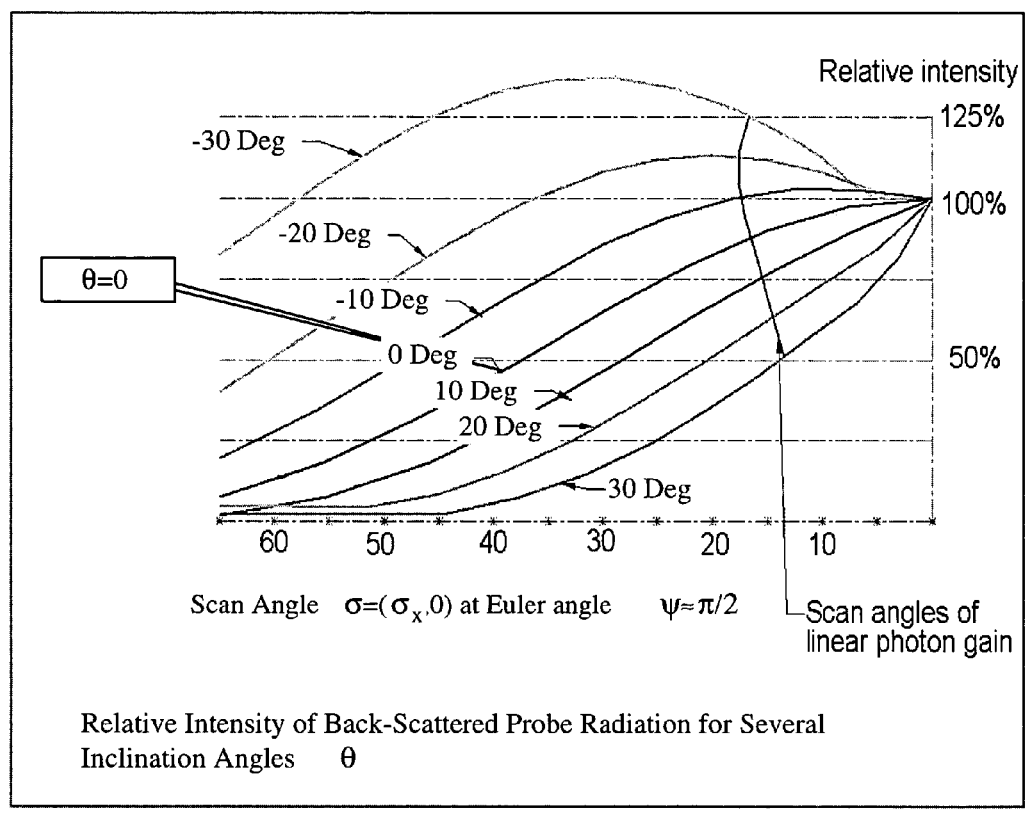
FIG. 6 is a graph illustrating relative radiation intensity of back-scattered portion of the probe radiation as a function of scan angle $\sigma=(\sigma_x,0)$

FIG. 6 illustrates graphs of relative intensity of back-scattered portion 40' of probe radiation 20 as a function of scan angle σ for a 0 to 65 degree continuous scan. The relative intensity is plotted in relation to nominal intensity of scan beam 28 representing 100%. The pose of object 10 in these graphs has an arbitrary value of first Euler angle φ but third Euler angle is limited to $\psi \approx \pi/2$. The graphs are obtained in 10 degree increments of inclination angle θ from −30 to 30 degrees. The graphs corresponding to different values of inclination angle θ are distinct.

To understand how these graphs are obtained and used to derive inclination angle θ we refer to FIG. 7. During the continuous scan detector 42 generates a signal corresponding to the intensity of back-scattered portion 40' of probe radiation 20. Amplifier 52 amplifies this signal to a gain level sufficient for conversion to a digital signal by ADC 54. Controller 62 supervises this process and adjusts gain of amplifier 52 as necessary.

The amplified signal is delivered to computing unit 56. During the continuous scan of angle σ computing unit 56 obtains a graph of intensity of back-scattered portion 40' and constructs a relative intensity graph by forming a ratio with nominal intensity of scan beam 28. The nominal intensity of scan beam 28 is provided by controller 62, which knows the power level of VCSEL 18 producing probe radiation 20. Alternatively, a scan beam power monitor (not shown) can provide the nominal intensity to computing unit 56.

In deriving inclination angle θ computing unit 56 compares the constructed relative intensity graph with calibrated relative intensity graphs in module 58 corresponding to specific values of inclination angle θ for cases where third Euler angle $\psi \approx \pi/2$. For rapid comparison, calibrated graphs are stored in the form of look-up tables. Typically, one or more stored graphs associated with a specific value of inclination angle θ and third Euler angle ψ will match closely to the constructed graph. These one or more graphs are interpolated to derive the inclination angle θ. In the present example, the look-up tables in module 58 contain the graphs shown in FIG. 6. Of course, look-up tables are obtained during calibration at other values of third Euler angle ψ and inclination angle θ for a continuous scan of angle σ.

The scan need not be continuous and can involve variation of both the x- and y-components $\sigma_x$, $\sigma_y$ of angle σ as permitted by biaxial scanner 32. To accomplish this X- and Y-drivers 36, 38 can vary x- and y-deflections $\gamma_x$, $\gamma_y$ in a periodic fashion as follows:

$$\gamma_x, \gamma_y = (A \sin \omega_x t, B \sin(\omega_y t + \Delta)). \qquad (Eq. 12)$$

In this equation A is the phase difference between x-deflection $\gamma_x$ and y-deflection $\gamma_y$, and A and B are deflection amplitudes in degrees. The instantaneous value of σ is obtained from Equation 2 as follows:

In this equation Δ is the phase difference between x-deflection $\gamma_x$ and y-deflection $\gamma_y$ and B is a deflection amplitude in degrees. The instantaneous value of σ is obtained from Equation 2 as follows:

$$\sigma(t)=(\sigma_x,\sigma_y)=(\mu+2A\sin\omega_x t, B\sin(\omega_x t+\Delta)). \quad \text{(Eq. 13)}$$

A person skilled in the art will recognize that Equation 13 represents a general parametric formulation of scan patterns known as Lissajous figures.

In the general application of the method a scan is preferably described in terms of scan patterns corresponding to paths traced out by scan point $P_o$. The scan patterns are more conveniently characterized by the successive values of vector $d_o$ and angle β in world coordinates $(X_o,Y_o,Z_o)$. Look-up tables of intensities describing the scans in terms of $d_o$, β and associating them with the values of ψ and θ while tip 12 is in contact with surface 24 are obtained during calibration. The calibration intrinsically determines the BRDF of surface 24 of substrate 26 at frequency f of probe radiation 20 for the incident directions of scan beam 28. Note that for back-scattering the scattering direction is equal and opposite to the incident direction. For a desired resolution of inclination angle θ a sufficiently large number of scans should be calibrated, as will be appreciated by one skilled in the art.

Figure 8:
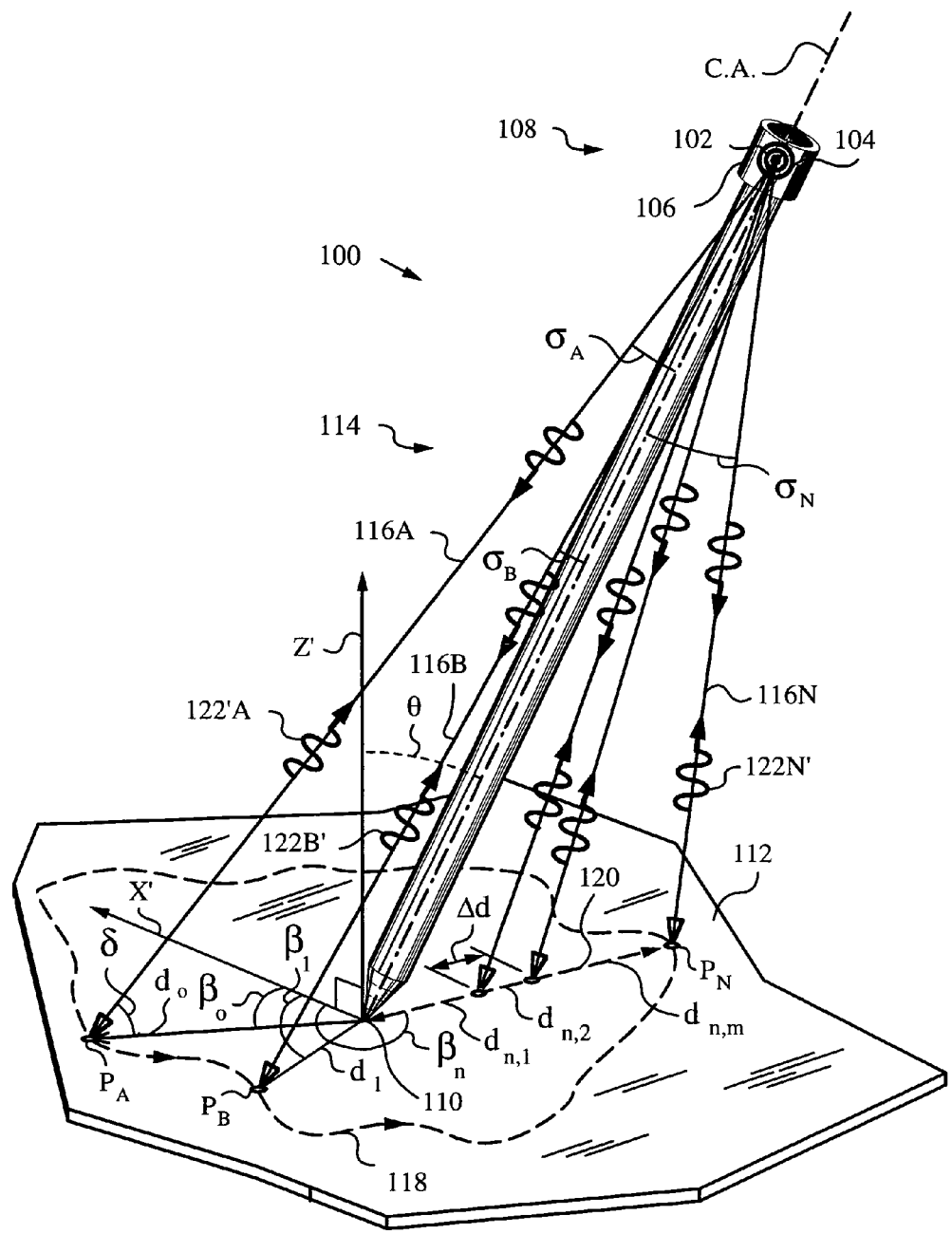
FIG. 8 is a three-dimensional view of an elongate object in which the emitter and detector are integrated.

FIG. 8 shows an embodiment of an elongate object 100 with an integrated emitter 102 and detector 104 mounted in a housing 106 at a top end 108 of object 100. Elongate object 100 has a tip 110 in contact with a plane surface 112. An inclination angle θ is defined between a center axis C.A. of object 100 and a normal to surface 112, namely the Z' axis of non-rotated object coordinates.

Emitter 102 generates a probe radiation 114 for illuminating surface 112. Emitter 102 is a single frequency emitter generating probe radiation at a single frequency f. Probe radiation 114 exits housing 106 in a number of collimated scan beams 116A, 116B, ... 116N at corresponding angles $\sigma_A, \sigma_B, \ldots \sigma_N$ to axis C.A. The shaping of probe radiation 114 into scan beams 116A, 116B, ... 116N can be accomplished with uniaxial or biaxial scanning arrangements including multiple scan arms and/or optics including light guiding optics such as holographic, refractive or diffractive elements (not shown). A person skilled in the art will recognize that there exists a plethora of optical elements and arrangements that permit requisite guiding, shaping steering and/or deflecting of probe radiation 114. It should also be noted, that emitter 102 can have more than one radiation source.

Angles $\sigma_A, \ldots \sigma_N$ to axis C.A. of scan beams 116A, ... 116N are varied in time with the selected scanning arrangement and optics. Each scan beam 116A, ... 116N produces a corresponding scan point $P_A, \ldots P_N$ on surface 112. Scan points $P_A, \ldots P_N$ follow scan patterns dictated by the changes in angles $\sigma_A, \ldots \sigma_N$ and the pose of object 100 as described, e.g., by the Euler angles. In the present embodiment, scan point $P_A$ follows a circuitous scan pattern 118 as indicated in dashed lines. Scan point $P_B$ follows scan pattern 118 as well but ahead of point $P_A$. Meanwhile, scan point $P_N$ follows a generally radial scan pattern 120 along $d_n$ incremented in steps Δd. At the pose shown, scan pattern 120 maintains a constant angle $\beta_n$ with axis X' and produces a number m of scan points at $d_{n,1}, d_{n,2}, \ldots d_{n,m}$.

Detector 104 receives back-scattered portions 122A', ... 122N' of probe radation 114 returning from scan points $P_A$, ... $P_N$ on surface 112. A computing unit (not shown) compares the back-scattered portions 122A', ... 122N' to previously calibrated look-up tables charting the response of surface 112 to probe radiation 114 at frequency f illuminating it from various incident directions. As in the previous embodiment, detector 104 is an intensity measurement unit such as a photodetector and uses radiation intensity as the radiation characteristic for deriving inclination angle θ. The look-up tables contain intensity graphs associating back-scattered intensities obtained at angles $\sigma_A, \ldots \sigma_N$ and third Euler angle ψ with inclination angle θ while tip 110 contacts surface 112.

Figure 9:
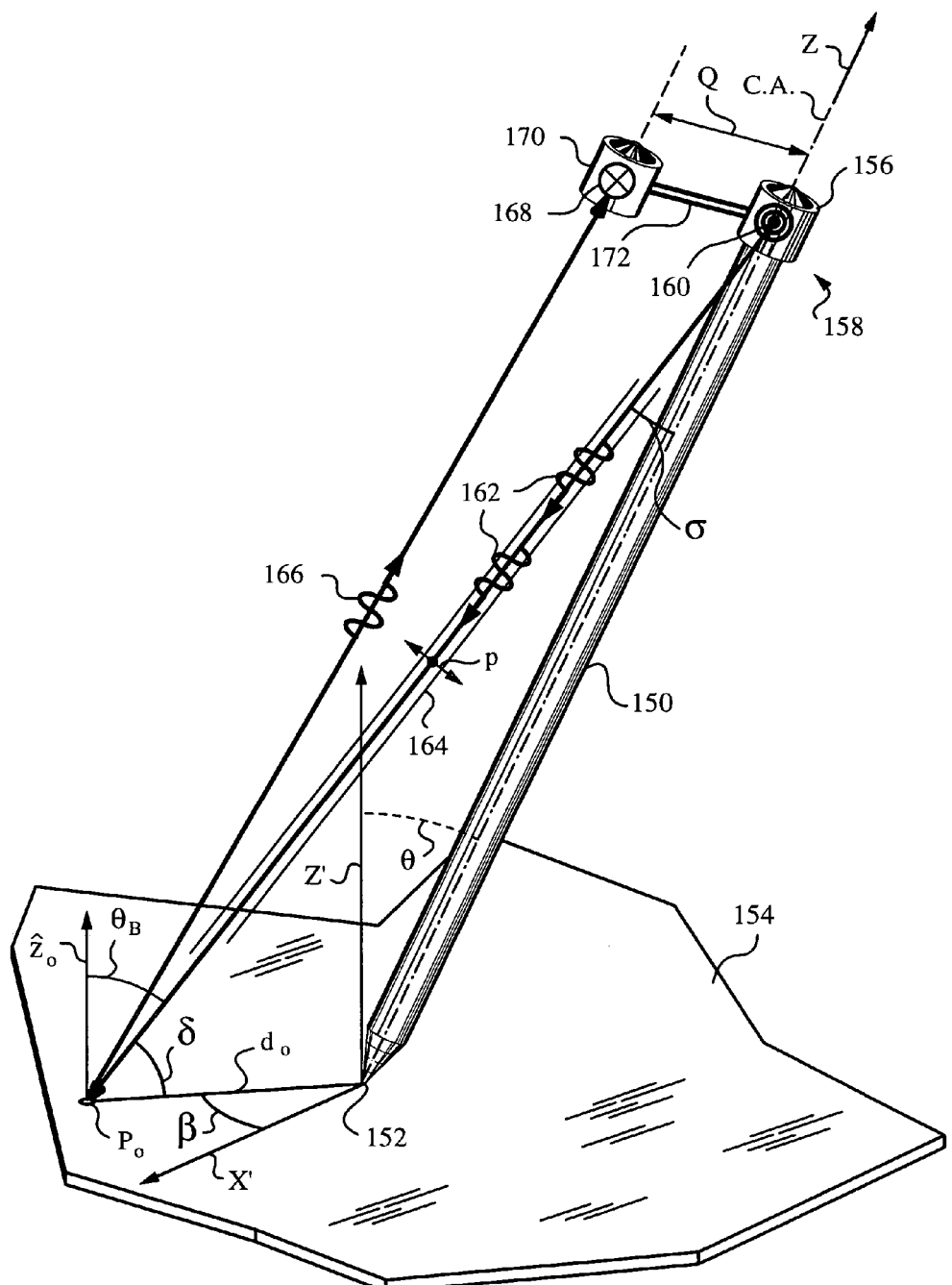
FIG. 9 is a three-dimensional view of an elongate object in which the emitter and detector are offset and polarization is used as the radiation characteristic for deriving inclination angle θ.

Alternatively, the radiation characteristic used for deriving inclination angle θ of an elongate object 150 is a polarization, as shown in the embodiment of FIG. 9. Elongate object 150 has a tip 152 resting on a plane surface 154. Plane surface 154 belongs to a dielectric material, e.g., paper. A housing 156 mounted at a top end 158 of object 150 contains an emitter 160. Emitter 160 emits a probe radiation 162 in a known polarization state, e.g., in a linear polarization state. In this embodiment, probe radiation 162 is linearly polarized in the p-polarization state as indicated by the polarization vector p and is contained in plane Σ (see, e.g., FIG. 1B). It should be noted that emitter 160 can use any appropriate polarization optics to ensure that probe radiation 162 is p-polarized.

Probe radiation 162 is collimated to a scan beam 164 by appropriate optics (not shown) and emitted at an angle σ to center axis C.A. of object 150. This embodiment is simplest to implement when angle σ has no $\sigma_y$ component such that beam 164 is in plane Σ.

Scan beam 164 illuminates surface 154 with probe radiation 162 incident at an angle of incidence δ to surface 154 at a scan point $P_o$. Probe radiation 162 is scattered from surface 154 in the form of scattered portion 166. The scattering depends on polarization of probe radiation 162 and the orientation of the polarization to surface 154 of dielectric material at scan point $P_o$. For certain incident directions scattering exhibits a variation because of the Brewster condition. In the case shown, ψ=π/2 and δ corresponds to the Brewster angle $\theta_B$ defined from the surface normal (rather than from surface 154). Under these conditions p-polarized probe radiation 162 will enter surface 154 and travel deep inside it. When surface 154 is a paper surface in particular, probe radiation 162 will experience significant absorption because of the internal structure of paper. Therefore, the intensity of scattered portion 166 from surface 154 detected by a detector 168 will show a drop-off.

Object 150 has detector 168 mounted at top end 158 in a housing 170 offset from housing 156 by an arm 172 of length Q. Thus, emitter 160 and detector 168 are offset from each other and detector 168 does not register any back-scattered portion of probe radiation 162. Rather, detector 168 collects scattered portion 166 returning from surface 154 at an angle different from angle of incidence 6 to surface 154.

Now, when ψ=π/2 and δ corresponds to $\theta_B$ as measured from the surface normal $\hat{z}_o$, then detector 168 will register a drop in scattered portion 166. For a set angle σ this condition occurs for a critical value of inclination angle θ. Hence, a computing unit can use the drop of signal corresponding to scattered portion 166 as an indication that inclination angle θ has reached the critical value. A look-up table can be constructed to map this critical value at other values of the third Euler angle ψ. Also, a scanning arrangement can be employed in this embodiment to vary angle σ.

Using polarization as the radiation characteristic for deriving inclination angle θ is sensitive when illuminating surface 154 near Brewster's angle. When a measure of inclination angle θ over a broader range is needed, an intensity-based measurement as described above can be used in conjunction with the polarization-based measurement.

Figure 10:
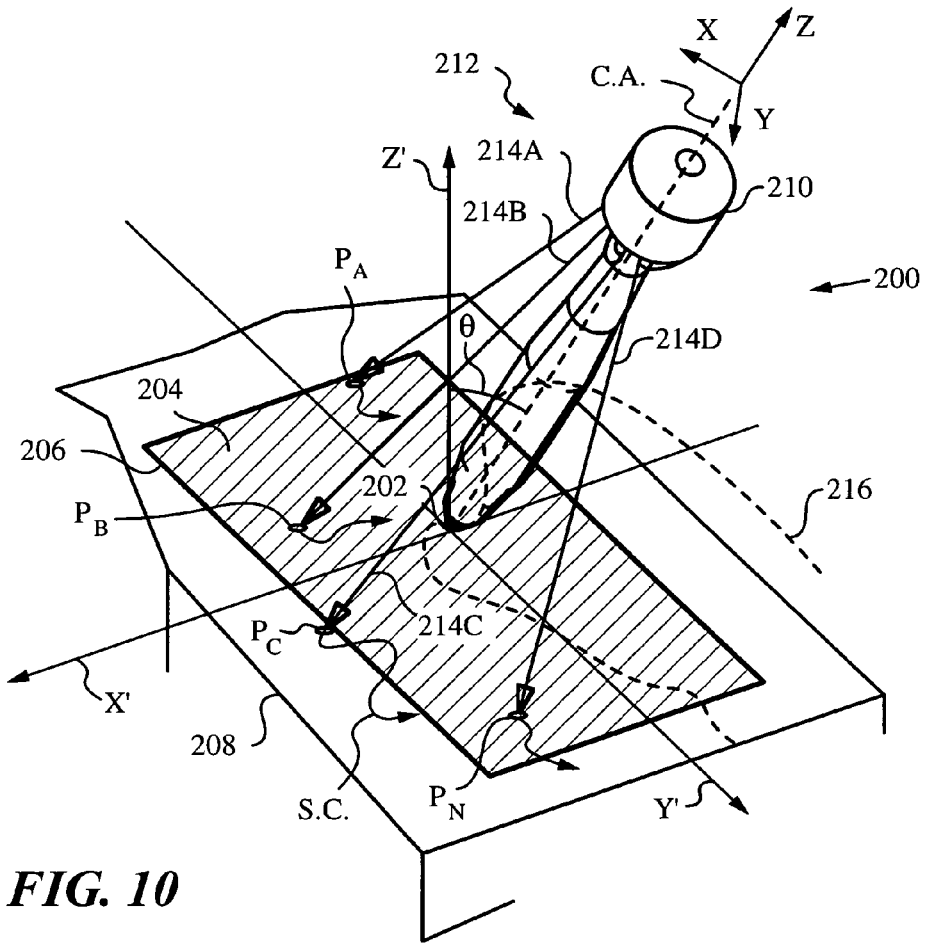
FIG. 10 is an isometric view of a preferred embodiment in which the elongate object is a jotting implement such as a pen or stylus.

A preferred implementation of the apparatus of invention is found when the elongate object is a jotting implement 200 as illustrated in FIG. 10. Jotting implement 200 is a pen whose tip 202 is a writing nib in contact with a plane surface 204 of a sheet of paper 206 on a tabletop 208. Pen 200 has a center axis C.A. aligned with the Z axis in the Euler rotated pen coordinates (X,Y,Z). An inclination angle θ corresponding to the second Euler angle is shown with respect to Z' axis which represents a surface normal.

A housing 210 is mounted at a top end 212 of pen 200. Housing 210 has an emitter, a detector for detecting radiation intensity, optics, a scanning arrangement with a number of scan arms analogous to the single scan arm described above and a computing unit for deriving inclination angle θ using intensity as the radiation characteristic. Since these elements and their operation have been described above they will not be called out in detail in this embodiment. A number of collimated scan beams 214A, 214B, . . . 214N are emitted from housing 210 at angles $\sigma_A$, . . . $\sigma_N$ to axis C.A. Angles $\sigma_A$, . . . $\sigma_N$ are varied to produce scan patterns traced out by corresponding scan points $P_A$, . . . $P_N$. The scan patterns can be uniaxial or biaxial as indicated by traces S.C.

Figure 12:
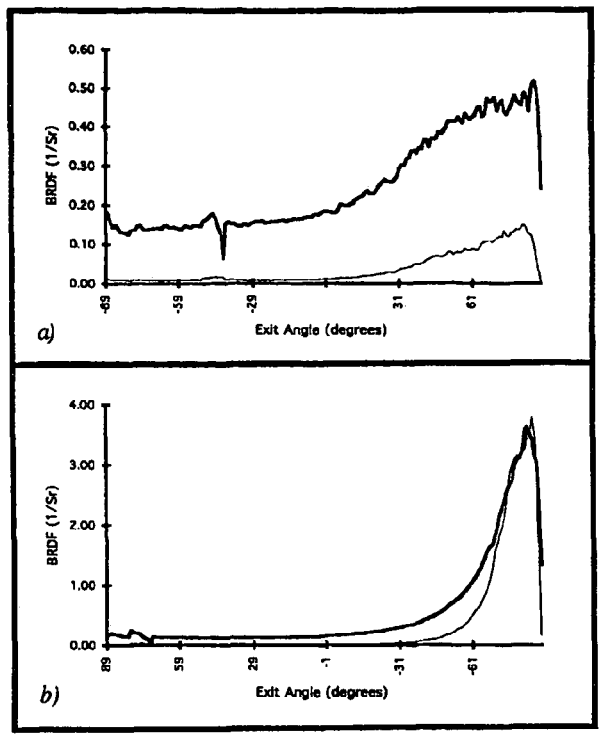
FIG. 12 are graphs illustrating the BRDF for paper.

Preferably, a back-scattered portion of probe radiation illuminating paper surface 204 is used in determining inclination angle θ. Also, before deployment of pen 200 it is preferable to calibrate the BRDF of paper 206 and table top 208 for the back-scattered portion. This will enable the computing unit to distinguish between back-scattered portion of probe radiation returning from paper 206 and tabletop 208. A BRDF for paper that is inked and non-inked for −45° and −75° angle of incidence are illustrated in FIG. 12. Of course, the method of the invention does not require that the back-scatter calibration be performed, since it can rely on relative changes in intensity where the absolute value of the intensity of the back scattered portion does not need to be known. For more information on BRDF of paper the reader is referred to Morgan T. Schramm and Gary W. Meyer, "Computer Graphic Simulation of Light Reflection from Paper", IS&T PICS Conference, 1998, pp. 412–423.

Figure 11:
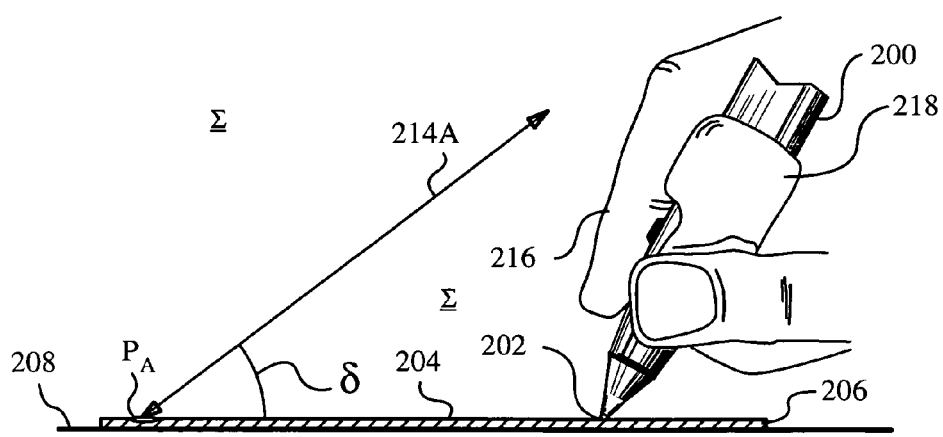
FIG. 11 is a side view illustrating a unit for limiting the variation of Euler angle ψ in the jotting implement.

During operation a user's hand 216 moves pen 200 to make markings on surface 204 of paper 206. Hence, scan patterns are preferably traced out on time scales smaller than any significant movement of hand 216. Thus, inclination angle θ can be determined by the computing unit in a "freeze-frame" fashion. Also, since it is advantageous perform a scan in the Σ plane at ψ=π/2 it is preferable to equip pen 200 with a roll-fixing grip 218, as shown in FIG. 11. In this manner the third Euler angle can be fixed not only for scan beam 214A but for all other scan beams 214B, . . . 214N. This leads to a significant reduction in processing required to match the calibrated intensity graphs in look-up tables with measured intensity graphs of back-scattered portions.

Figure 13:
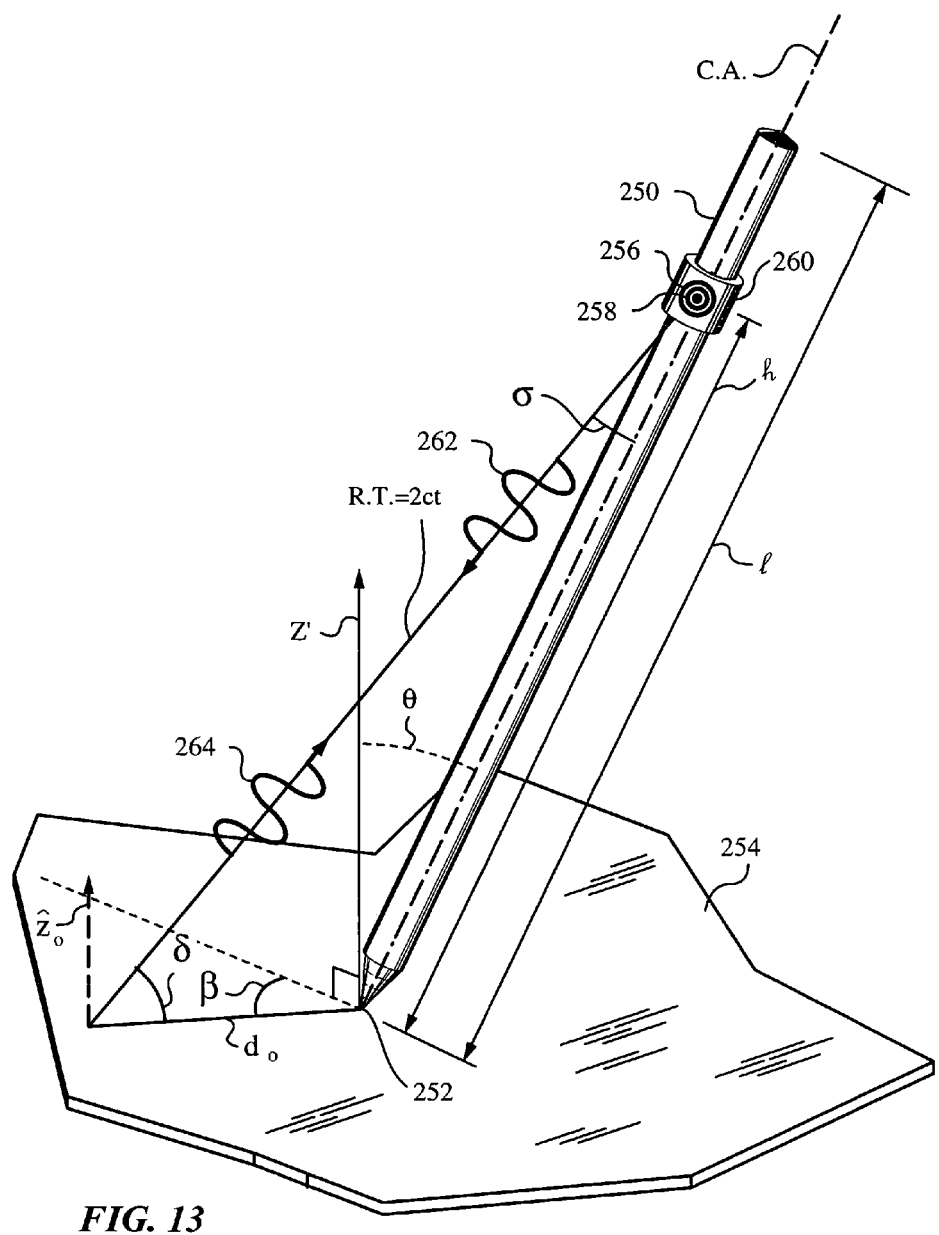
FIG. 13 is an isometric view of an elongate object in which the time-of-flight is the radiation characteristic used for deriving inclination angle θ.

FIG. 13 illustrates still another embodiment of the invention in which time-of-flight is the radiation characteristic used for determining inclination angle θ of an elongate object 250. Object 250 has a length l and terminates in a tip 252 in contact with a plane surface 254. Object 250 has an axis C.A. inclined at an inclination angle θ with respect to a normal to surface 254 represented by Z' axis. An emitter 256 and a detector 258 are integrated into a single housing 260 mounted at a height h on object 250.

Emitter 256 sends out a probe radiation 262 at an angle σ to axis C.A. to illuminate surface 254. Probe radiation 262 is scattered at surface 254 and a back-scattered portion 264 of probe radiation 262 returns from surface 254 to housing 260. Once inside housing 260 back-scattered portion 264 is delivered to detector 258. Detector has a gating circuit in communication with emitter 256 for determining the time-of-flight of probe radiation 262 since being emitted from emitter 256. The time of flight depends on a round-trip distance R.T.

There are numerous techniques to measure the time-of-flight with the gating circuit. For example, U.S. Pat. No. 6,323,942 teaches a technique where a fast electronic counter is embedded in the detector. This technique can be adapted to the present embodiment by embedding the fast electronic counter in detector 258 and setting it to trigger when emitter 256 sends a pulse of probe radiation 262. The pulsing of probe radiation 262 can be achieved by a laser pulse driver, e.g., as described above (see FIG. 7) or by other techniques familiar to a skilled artisan. The counter stops when back-scattered portion 264 arrives at detector 258 and the time-of-flight is then recorded. The counter is reset and triggered for every new pulse of probe radiation 262 emitted by emitter 256. Thus, round-trip distance R.T. is measured for varying values of angle σ.

U.S. Pat. Nos. 6,057,909 and 6,331,911 teach still another technique where a fast opto-electronic shutter blocks the detector before any back-scattered pulse arrives entirely. This technique can be adapted to the present embodiment by providing detector 258 with a fast shutter and setting it to block detector 258 before the entire back-scattered portion 264 of a pulse of probe radiation 262 arrives at detector 258. Probe radiation 262 detected by detector 258 is correlated to round-trip distance R.T. At small values of R.T. a large fraction of the pulse of probe radiation 262 is detected by detector 258 before the shutter closes. Conversely, at large values of R.T. a small fraction of the pulse of probe radiation 262 is detected by detector 258 before the shutter closes. Distance R.T. is thus inferred from the radiation energy detected by detector 258. The shutter is preferably an opto-electronic shutter triggered at every pulse of probe radiation 262 emitted by emitter 256. Thus, round-rip distance R.T. is measured for varying values of angle σ.

Yet another technique that can be adapted to the present embodiment modulates the intensity of pulses of probe radiation 262 emitted by emitter 256 using a reference sinusoidal signal of a frequency higher than the inverse of the duration of the pulse. In this embodiment the laser pulse driver has to be appropriately supervised by a controller (not shown). Back-scattered portion 264 of probe radiation 262 detected by detector 258 has the same modulation characteristics as the reference signal, except for amplitude and phase variations. As will be clear to one skilled in the art, the phase difference is directly related to distance R.T. Numerous circuits and techniques exist to measure distance from phase differences. For related teachings the reader is referred to techniques in RADAR and LADAR systems.

It should be noted that time-of-flight can be used as the radiation characteristic for deriving inclination angle θ by itself or in combination with an intensity-based measurement as described above. In fact, it can also be deployed in conjunction with a polarization-based measurement. In general, according to the invention, any combination of radiation characteristics and corresponding detection methods and systems can be used to derive inclination angle θ.

A number of alternative embodiments use the emitter to illuminate the plane surface at a number of frequencies rather than a single frequency. In those embodiments the detector is sensitive to one or more frequencies and can comprise an array of detection devices if necessary.

In other alternative embodiments, the scanning arrangement is made up of various hybrid scanning arrangements, e.g., uniaxial and biaxial, with scan mirrors located on and off center axis of the elongate object. In any of these arrangements, the detector can be mounted above the emitter or vice versa, as determined most suitable for the application at hand.

Figure 14:
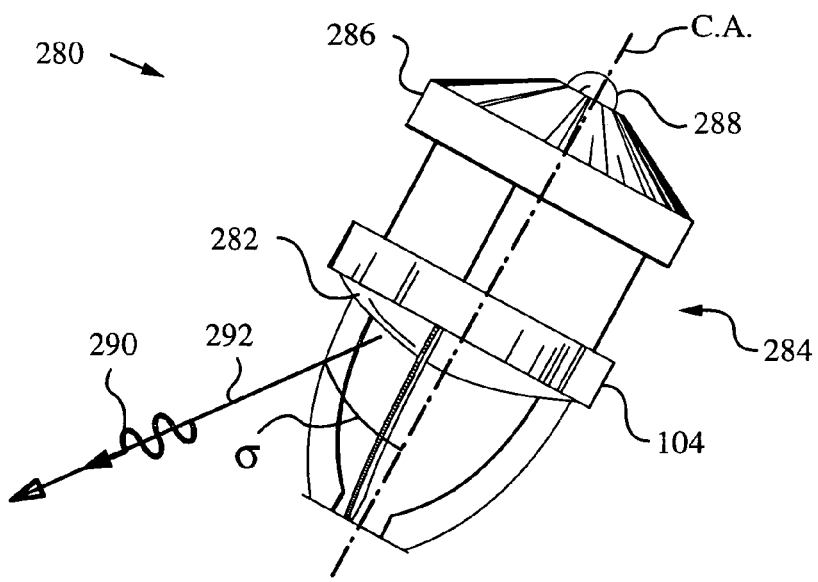
FIG. 14 is an isometric view of a portion of an apparatus employing a light guiding optic.

FIG. 14 illustrates a portion of yet another alternative embodiment of an apparatus 280 using a light guiding optic 282. Optic 282 is mounted in a head 284 below a housing portion 286 containing an emitter 288 of probe radiation 290. Optic 282 can be a holographic, refractive or diffractive element for varying or determining angle σ. In fact, even a reflective element such as a rotating reflective element can be used as optic 282. Optic 282 can replace a scanning arrangement and can be used in any of the above embodiments to vary or determine angle σ. Optic 282 is compatible with a scan beam 292 of probe radiation 290, as shown. Alternatively, optic 282 can perform a spatial filtering function on probe radiation 290 incident on it over a large solid angle of incidence, and only permit probe radiation 290 to exit from it at an exit angle equal to angle σ.

It will be evident to a person skilled in the art that the present invention admits of various other embodiments. Therefore, the scope of the invention should be accorded the breadth dictated by the appended claims and their legal equivalents.

The invention claimed is:

1. An apparatus for determining an inclination angle θ between an axis of an elongate object contacting a plane surface with a tip and a normal to said plane surface, said apparatus comprising:
   a) an emitter on said elongate object for illuminating said plane surface with a probe radiation at an angle σ to said axis;
   b) a detector on said elongate object for detecting a radiation characteristic of a scattered portion of said probe radiation returning from said plane surface; and
   c) a computing unit for deriving said inclination angle θ from said radiation characteristic.

2. The apparatus of claim 1, further comprising a scanning arrangement for varying said angle σ.

3. The apparatus of claim 2, wherein said scanning arrangement comprises a uniaxial scanner for varying an x-component $\sigma_x$ of said angle σ by introducing an x-deflection $\gamma_x$.

4. The apparatus of claim 3, wherein said uniaxial scanner further comprises a scan arm having a uniaxial scan mirror and an X-driver for controlling said x-deflection $\gamma_x$.

5. The apparatus of claim 2, wherein said scanning arrangement comprises a biaxial scanner for varying an x-component $\sigma_x$ and a y-component $\sigma_y$ of said angle σ by introducing an x-deflection $\gamma_x$ and a y-deflection $\gamma_y$.

6. The apparatus of claim 5, wherein said biaxial scanner further comprises a scan arm having a biaxial scan mirror and an X-driver for controlling said x-deflection $\gamma_x$ and a Y-driver for controlling said y-deflection $\gamma_y$.

7. The apparatus of claim 1, further comprising a light guiding optic for determining said angle σ.

8. The apparatus of claim 1, wherein said emitter and said detector are integrated.

9. The apparatus of claim 1, wherein said emitter and said detector are offset.

10. The apparatus of claim 1, wherein said detector comprises a time-of-flight measuring unit and said radiation characteristic is a flight time.

11. The apparatus of claim 1, wherein said emitter emits said probe radiation in a polarization state and said radiation characteristic is a polarization.

12. The apparatus of claim 1, wherein said detector comprises an intensity measurement unit and said radiation characteristic is a back-scattered intensity.

13. The apparatus of claim 1, further comprising an optic for shaping said probe radiation into a scan beam.

14. The apparatus of claim 1, further comprising a scanning arrangement having a number of scan arms for shaping said probe radiation into a corresponding number of scan beams.

15. The apparatus of claim 1 wherein said elongate object is selected from the group consisting of jotting implements, pointers and canes.

16. The apparatus of claim 15, wherein said jotting implements are selected from the group consisting of pens, pencils and styluses.

17. The apparatus of claim 1, wherein said computing unit is located on said elongate object.

18. The apparatus of claim 1, wherein said emitter is a single frequency emitter.

19. A method for determining an inclination angle θ between an axis of an elongate object contacting a plane surface with a tip and a normal to said plane surface, said method comprising:
   a) illuminating said plane surface with a probe radiation from said elongate object and at an angle σ to said axis;
   b) detecting a radiation characteristic of a scattered portion of said probe radiation returning from said plane surface to said object; and
   c) deriving said inclination angle θ from said radiation characteristic.

20. The method of claim 19, further comprising shaping said probe radiation into a scan beam.

21. The method of claim 19, further comprising varying said angle σ in a scan pattern.

* * * * *